United States Patent [19]
Toda

[11] Patent Number: 5,767,604
[45] Date of Patent: Jun. 16, 1998

[54] ELASTIC WAVE DEVICE FOR SENSING A TOUCH-POSITION

[76] Inventor: Kohji Toda, 1-49-18 Futaba, Yokosuka, Japan, 239

[21] Appl. No.: 812,708

[22] Filed: Mar. 6, 1997

[51] Int. Cl.⁶ .................................................. H01L 41/04
[52] U.S. Cl. ........................... 310/313 R; 310/313 B; 310/313 C
[58] Field of Search ........................ 310/313 R, 366, 310/313 B, 313 D, 313 C

[56] References Cited

U.S. PATENT DOCUMENTS

| | | | |
|---|---|---|---|
| Re. 33,151 | 1/1990 | Adler | 340/712 |
| 4,203,082 | 5/1980 | Tsukamoto et al. | 333/194 |
| 4,293,734 | 10/1981 | Pepper, Jr. | 178/18 |
| 5,591,945 | 1/1997 | Kent | 178/19 |
| 5,679,998 | 10/1997 | Toda | 310/313 R |

Primary Examiner—Mark O. Budd
Assistant Examiner—Timothy A. Williams

[57] ABSTRACT

An elastic wave position-sensing device comprising two elastic wave transducing units X and Y, a nonpiezoelectric plate, and a controlling system connected with the units X and Y. Each unit consists of a piezoelectric substrates $P_T$ and $P_R$, interdigital transducers $T_0$ and $T_i$ (i=1, 2, ..., N) formed on one end surface of the piezoelectric substrate $P_T$, interdigital transducers $R_0$, $R_{i1}$ and $R_{i2}$ (i=1, 2, ..., N) placed on one end surface of the piezoelectric substrate $P_R$. Each of the interdigital transducers $R_{i1}$ and $R_{i2}$ is placed such that the finger direction thereof is slanting to that of the interdigital transducer $T_i$ by an angle α. The thickness d of the piezoelectric substrates $P_T$ and $P_R$ is smaller than an interdigital periodicity P of the interdigital transducers $T_0$, $T_i$ and $R_0$. The thickness of the nonpiezoelectric plate is smaller than two times the thickness d, the piezoelectric substrates $P_T$ and $P_R$ being mounted on one end surface of the nonpiezoelectric plate. A part, adjacent to the piezoelectric substrate $P_T$, of the nonpiezoelectric plate, and the piezoelectric substrate $P_T$ form a bilayer zone $B_T$. A part, adjacent to the piezoelectric substrate $P_R$, of the nonpiezoelectric plate, and the piezoelectric substrate $P_R$ form a bilayer zone $B_R$. When an electric signal is applied to each of the interdigital transducers $T_0$ and $T_i$, an elastic wave is excited in the bilayer zone $B_T$ and transmitted to the bilayer zone $B_R$ through the monolayer zone between the bilayer zones $B_T$ and $B_R$.

20 Claims, 20 Drawing Sheets

5,767,604

ELASTIC WAVE DEVICE FOR SENSING A TOUCH-POSITION

BACKGROUND OF THE INVENTION

1. Field of the Invention

The present invention relates to an elastic wave device for sensing a touch-position on one or the other end surface of a nonpiezoelectric plate having two elastic wave transducing units.

2. Description of the Prior Art

An ultrasonic form of conventional touch panels has a nonpiezoelectric plate under acoustic vibration, which is decreased or disappeared when touching on the nonpiezoelectric plate. Conventional methods for exciting the acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, an accurate detection of a minute touch-position, and a small-sized circuit with a simple structure. Moreover, there are some problems on manufacturing, mass production and operation frequencies.

SUMMARY OF THE INVENTION

An object of the present invention is to provide an elastic wave position-sensing device capable of specifying a minute touch-position on one or the other end surface of a nonpiezoelectric plate with a high sensitivity and a quick response time.

Another object of the present invention is to provide an elastic wave position-sensing device excellent in manufacturing and mass-production.

A still other object of the present invention is to provide an elastic wave position-sensing device operating under low power consumption with low voltage.

A still further object of the present invention is to provide an elastic wave position-sensing device having a small-sized circuit with a simple structure which is very light in weight.

According to one aspect of the present invention there is provided an elastic wave position-sensing device comprising two elastic wave transducing units X and Y, a nonpiezoelectric plate having an upper- and a lower end surfaces running perpendicular to the thickness direction thereof, and a controlling system connected with the elastic wave transducing units X and Y. Each elastic wave transducing unit consists of a piezoelectric substrate $P_T$ having two end surfaces running perpendicular to the direction of the thickness d thereof, a piezoelectric substrate $P_R$ having two end surfaces running perpendicular to the direction of the thickness d thereof, an input interdigital transducer $T_0$ formed on one end surface of the piezoelectric substrate $P_T$, N input interdigital transducers $T_i$ (i=1, 2, ..., N) formed on the one end surface of the piezoelectric substrate $P_T$, an output interdigital transducer $R_0$ opposed to the interdigital transducer $T_0$ and formed on one end surface of the piezoelectric substrate $P_R$, and at least two output interdigital transducers $R_{i1}$ and $R_{i2}$ (i=1, 2, ..., N) opposed to each interdigital transducer $T_i$ and formed on the one end surface of the piezoelectric substrate $P_R$. The interdigital transducer $R_0$ is placed such that the finger direction of the interdigital transducer $R_0$ runs parallel with that of the interdigital transducer $T_0$. The thickness d of the piezoelectric substrates $P_T$ and $P_R$ is smaller than an interdigital periodicity P of the interdigital transducers $T_0$, $T_i$ and $R_0$. The thickness of the nonpiezoelectric plate is smaller than two times the interdigital periodicity P. Each of the interdigital transducers $R_{i1}$ and $R_{i2}$ is placed such that the finger direction thereof is slanting to that of the interdigital transducer $T_i$ by an angle $\alpha$. An interdigital periodicity $P_N$ along the vertical direction to the finger direction of the interdigital transducers $R_{i1}$ and $R_{i2}$ is equal to the product of the interdigital periodicity P and $\cos\alpha$. The sum of an overlap length $L_P$ along the finger direction of the interdigital transducer $R_{i1}$ and that of the interdigital transducer $R_{i2}$ is approximately equal to the product of an overlap length L of the interdigital transducer $T_i$ and $\sec\alpha$. The piezoelectric substrates $P_T$ and $P_R$ are mounted on one end surface of the nonpiezoelectric plate. A part, adjacent to the piezoelectric substrate $P_T$, of the nonpiezoelectric plate, and the piezoelectric substrate $P_T$ form a bilayer zone $B_T$. A part, adjacent to the piezoelectric substrate $P_R$, of the nonpiezoelectric plate, and the piezoelectric substrate $P_R$ form a bilayer zone $B_R$. The remaining part, between the bilayer zones $B_T$ and $B_R$, of the nonpiezoelectric plate consists of a monolayer zone.

When an electric signal with a frequency approximately corresponding to the interdigital periodicity P is applied to each of the interdigital transducers $T_0$ and $T_i$, an elastic wave of the $S_0$ mode and the higher order modes is excited in the bilayer zone $B_T$ and transmitted to the bilayer zone $B_R$ through the monolayer zone. The phase velocity of the elastic wave is approximately equal to the phase velocity $V_{fd=0}$ of the $S_0$ mode elastic wave, corresponding to a condition that the product fd of the frequency f of the elastic wave and the thickness d is zero. The elastic wave excited by the interdigital transducer $T_0$ is transduced to an electric signal with a phase $\theta_{base}$, and delivered at the interdigital transducer $R_0$. The elastic wave excited by each interdigital transducer $T_i$ is transduced to electric signals $E_j$ (j=1, 2, ..., $\chi$) with phases $\theta_j$ (j=1, 2, ..., $\chi$), by each of the interdigital transducers $R_{i1}$ and $R_{i2}$, the phases $\theta_j$ corresponding to positions $F_j$ (j=1, 2, ..., $\chi$) on one or the other end surface of the monolayer zone, each electric signal $E_j$ having a frequency approximately corresponding to the interdigital periodicity P. The total phase $\Sigma\theta_j$ made by the phases $\theta_j$ is zero, and the total electric signal $\Sigma E_j$ made by the electric signals $E_j$ is also zero and not able to be detected at each of the interdigital transducers $R_{i1}$ and $R_{i2}$. The interdigital transducers $T_i$ and $R_{i1}$ form N propagation lanes $D_{i1}$ (i=1, 2, ..., N) of the elastic wave in the monolayer zone. The interdigital transducers $T_i$ and $R_{i2}$ form N propagation lanes $D_{i2}$ (i=1, 2, ..., N) of the elastic wave in the monolayer zone. Two neighbors of the propagation lanes $D_{i1}$ and $D_{i2}$ are closed or partially overlapping each other. The propagation lanes $D_{i1}$ and $D_{i2}$ of the elastic wave transducing unit X and that of the elastic wave transducing unit Y are vertical to each other. Each propagation lane consists of minute propagation lanes $Z_j$ (j=1, 2, ..., χ) corresponding to the positions $F_j$. If touching a position $F_X$ on a minute propagation lane $Z_X$ out of the propagation lanes $D_{i1}$ and $D_{i2}$, an electric signal E with a phase θ is delivered from one of the interdigital transducers $R_{i1}$ and $R_{i2}$, the position $F_X$ corresponding to an electric signal $E_X$ with a phase $θ_X$, the total electric signal $ΣE_j$ minus the electric signal $E_X$ being equal to the electric signal E, the total phase $Σθ_j$ minus the phase $θ_X$ being equal to the phase θ. The controlling system senses a touch with a finger or others on the position $F_X$ by an appearance of the electric signal E at the one of the interdigital transducers $R_{i1}$ and $R_{i2}$, and finds the position $F_X$ by detecting the one, delivering the electric signal E, of the interdigital transducers $R_{i1}$ and $R_{i2}$, and by evaluating a difference between the phases θ and $θ_{base}$.

According to another aspect of the present invention there are provided N switches $W_i$ (i=1, 2, ..., N) corresponding to the interdigital transducers $T_i$, an output terminal of each switch $W_i$ being connected with an input terminal of each interdigital transducer $T_i$. Output terminals of the interdigital transducers $R_{i1}$ are connected with each other at an output point $Q_1$. Output terminals of the interdigital transducers $R_{i2}$ are connected with each other at an output point $Q_2$. The controlling system turns on and off the switches $W_i$ with a fixed period in turn, senses a touch on the position $F_X$ by an appearance of the electric signal E at one of the output points $Q_1$ and $Q_2$, and finds the position $F_X$ by detecting the one, delivering the electric signal E, of the output points $Q_1$ and $Q_2$, by choosing a closed one out of the switches $W_i$ when the electric signal E appears, and by evaluating the difference between the phases θ and $θ_{base}$.

According to another aspect of the present invention there is provided an amplifier $A_X$, an input terminal of the interdigital transducer $R_0$ of the elastic wave transducing unit X being connected with each input terminal of the interdigital transducer $T_0$ of the elastic wave transducing units X and Y via the amplifier $A_X$. The interdigital transducers $T_0$ and $R_0$ in the elastic wave transducing unit X, a propagation lane of an elastic wave between the interdigital transducers $T_0$ and $R_0$ in the elastic wave transducing unit X, and the amplifier $A_X$ form an oscillator.

According to another aspect of the present invention there is provided an elastic wave position-sensing device comprising two elastic wave transducing units X and Y, the nonpiezoelectric plate, and the controlling system connected with the elastic wave transducing units X and Y. Each elastic wave transducing unit consists of the piezoelectric substrates $P_T$ and $P_R$, the interdigital transducers $T_0$, $R_0$, $R_{i1}$ and $R_{i2}$, N input interdigital transducers $M_i$ (i=1, 2, ..., N) in place of the interdigital transducers $T_i$ formed on the upper end surface of the piezoelectric substrate $P_T$, N earth electrodes $G_i$ (i=1, 2, ..., N) formed on the lower end surface of the piezoelectric substrate $P_T$ and corresponding with the interdigital transducers $M_i$, respectively, and a phase shifter S including at least a coil $L_1$. Each interdigital transducer $M_i$ having the same interdigital periodicity as the interdigital periodicity P, consists of two electrodes $M_{i-1}$ and $M_{i-2}$ and has two kinds of distances between one electrode finger of the electrode $M_{i-1}$ and two neighboring electrode fingers of the electrode $M_{i-2}$. Each of the interdigital transducers $R_{i1}$ and $R_{i2}$ is placed such that the finger direction thereof is slanting to that of the interdigital transducer $M_i$ by an angle α, respectively.

When electric signals $V_1$ and $V_2$, with a frequency approximately corresponding to the interdigital periodicity P, are applied between the electrode $M_{i-1}$ and the earth electrode $G_i$, and between the electrode $M_{i-2}$ and the earth electrode $G_i$ via the phase shifter S, respectively, an unidirectional elastic wave of the $S_0$ mode and the higher order modes is excited in the bilayer zone $B_T$, on condition that x<½ in a shorter distance xP of the two kinds of distances between one electrode finger of the electrode $M_{i-1}$ and two neighboring electrode fingers of the electrode $M_{i-2}$, and x+y±½ in a phase difference 2πy between the electric signals $V_1$ and $V_2$. The unidirectional elastic wave is transmitted to the bilayer zone $B_R$ through the monolayer zone. The unidirectional elastic wave excited by each interdigital transducer $M_i$ and each earth electrode $G_i$ is transduced to electric signals $E_j$ with phases $θ_j$, respectively, the phases $θ_j$ corresponding to the positions $F_j$. The interdigital transducers $M_i$ and $R_{i1}$ form N propagation lanes $D_{i1}$ of the elastic wave in the monolayer zone. The interdigital transducers $M_i$ and $R_{i2}$ form N propagation lanes $D_{i2}$ of the elastic wave in the monolayer zone. Each propagation lanes $D_{i1}$ and $D_{i2}$ consists of minute propagation lanes $Z_j$ corresponding to the positions $F_j$. If touching a position $F_X$ on a minute propagation lane $Z_X$, an electric signal E with a phase θ is delivered from one of the interdigital transducers $R_{i1}$ and $R_{i2}$. The controlling system senses a touch with a finger or others on the position $F_X$ by an appearance of the electric signal E at the one of the interdigital transducers $R_{i1}$ and $R_{i2}$, and finds the position $F_X$ by detecting the one, delivering the electric signal E, of the interdigital transducers $R_{i1}$ and $R_{i2}$, and by evaluating a difference between the phases θ and $θ_{base}$.

According to another aspect of the present invention there is provided a nonpiezoelectric plate made of a material such that the phase velocity of the elastic wave traveling on the nonpiezoelectric plate alone is higher than that traveling on the piezoelectric substrates $P_T$ and $P_R$ alone, the nonpiezoelectric plate having a dimension in thickness smaller than the thickness d of the piezoelectric substrates $P_T$ and $P_R$.

According to another aspect of the present invention there is provided a nonpiezoelectric plate made of a material such that the phase velocity of the elastic wave traveling on the nonpiezoelectric plate alone is approximately equal to that traveling on the piezoelectric substrates $P_T$ and $P_R$ alone, the nonpiezoelectric plate having a dimension in thickness approximately equal to the thickness d of the piezoelectric substrates $P_T$ and $P_R$.

According to other aspect of the present invention there is provided a nonpiezoelectric plate made of a material such that the phase velocity of the elastic wave traveling on the nonpiezoelectric plate alone is lower than that traveling on the piezoelectric substrates $P_T$ and $P_R$ alone, the nonpiezoelectric plate having a dimension in thickness larger than the thickness d of the piezoelectric substrates $P_T$ and $P_R$.

According to a further aspect of the present invention there are provided piezoelectric substrates $P_T$ and $P_R$ made of a piezoelectric polymer such as PVDF and so on, or made of a piezoelectric ceramic, the polarization axis thereof being parallel to the thickness direction thereof.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
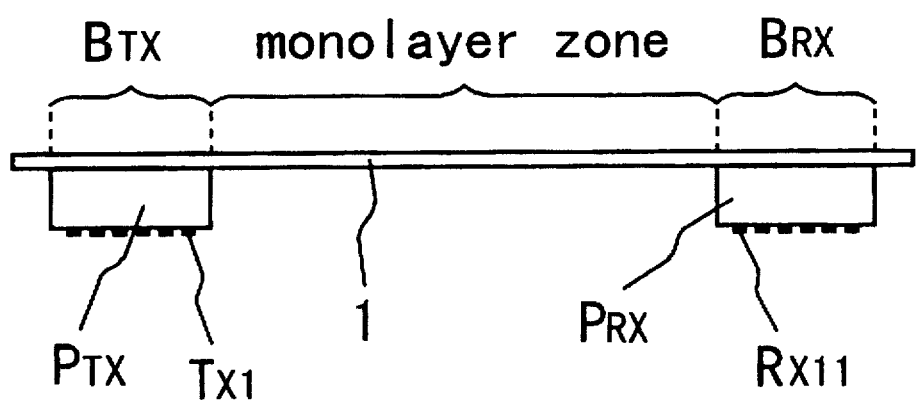
FIG. 1 shows a sectional view of an elastic wave position-sensing device according to a first embodiment of the present invention.

FIG. 1 shows a sectional view of an elastic wave position-sensing device according to a first embodiment of the present invention. The elastic wave position-sensing device comprises nonpiezoelectric plate (1) having an upper- and a lower end surfaces running perpendicular to the thickness direction thereof, controlling system (2), switches ($W_1$ and $W_2$), amplifier ($A_X$) and elastic wave transducing units (X and Y). Elastic wave transducing unit (X) comprises piezoelectric substrates ($P_{TX}$ and $P_{RX}$), input interdigital transducers ($T_{X0}$, $T_{X1}$ and $T_{X2}$), and output interdigital transducers ($R_{X0}$, $R_{X11}$, $R_{X12}$, $R_{X13}$, $R_{X14}$, $R_{X21}$, $R_{X22}$, $R_{X23}$ and $R_{X24}$). Elastic wave transducing unit (Y) comprises piezoelectric substrate ($P_{TY}$ and $P_{RY}$), input interdigital transducers ($T_{Y0}$, $T_{Y1}$ and $T_{Y2}$) and output interdigital transducers ($R_{Y0}$, $R_{Y11}$, $R_{Y12}$, $R_{Y13}$, $R_{Y14}$, $R_{Y21}$, $R_{Y22}$, $R_{Y23}$ and $R_{Y24}$). FIG. 1 shows only nonpiezoelectric plate (1), piezoelectric substrates ($P_{TX}$ and $P_{RX}$), and interdigital transducers ($T_{X1}$ and $R_{X11}$). Each piezoelectric substrate, of which material is piezoelectric ceramic and having two end surfaces running perpendicular to the direction of the thickness d thereof, is cemented on the lower end surface of nonpiezoelectric plate (1), of which material is glass and having a dimension of 150 μm in thickness, through an epoxy resin with thickness of about 20 μm. Each piezoelectric substrate has a dimension of 1 mm in thickness. A part, adjacent to piezoelectric substrate ($P_{TX}$), of nonpiezoelectric plate (1), and piezoelectric substrate ($P_{TX}$) form a bilayer zone $B_{TX}$. A part, adjacent to piezoelectric substrate ($P_{RX}$), of nonpiezoelectric plate (1), and piezoelectric substrate ($P_{RX}$) form a bilayer zone $B_{RX}$. The remaining part, between the bilayer zones $B_{TX}$ and $B_{RX}$, of nonpiezoelectric plate (1) consists of a monolayer zone. In the same way, a part, adjacent to piezoelectric substrate ($P_{TY}$), of nonpiezoelectric plate (1), and piezoelectric substrate ($P_{TY}$) form a bilayer zone $B_{TY}$. A part, adjacent to piezoelectric substrate ($P_{RY}$), of nonpiezoelectric plate (1), and piezoelectric substrate ($P_{RY}$) form a bilayer zone $B_{RY}$. The remaining part, between the bilayer zones $B_{TY}$ and $B_{RY}$, of nonpiezoelectric plate (1) consists of the monolayer zone.

Figure 2:
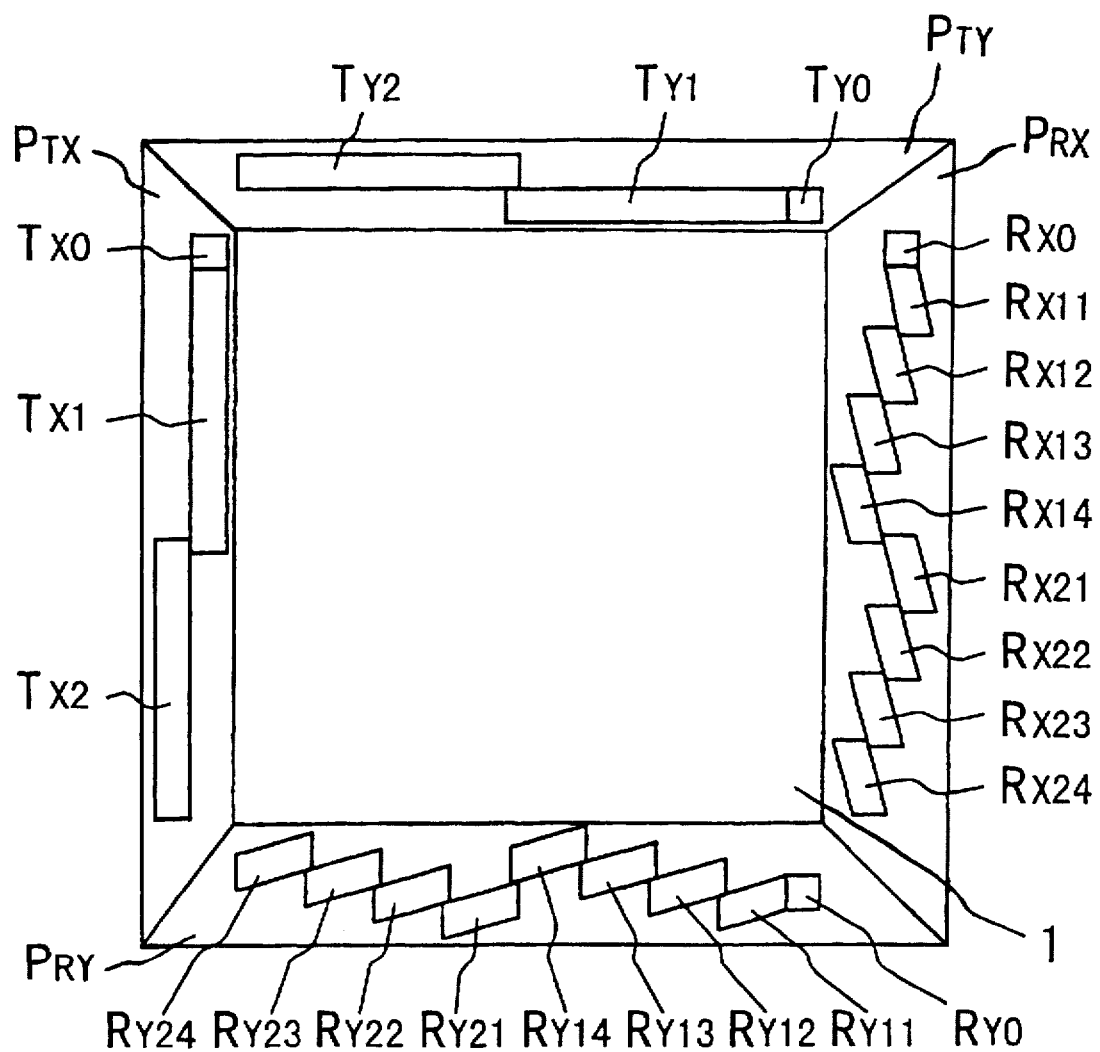
FIG. 2 shows a plan view of the elastic wave position-sensing device in FIG. 1.

FIG. 2 shows a plan view of the elastic wave position-sensing device in FIG. 1. FIG. 2 shows only nonpiezoelectric plate (1), the piezoelectric substrates and the interdigital transducers made from aluminium thin film. Interdigital transducers ($T_{X0}$, $T_{X1}$ and $T_{X2}$) are mounted on one end surface of piezoelectric substrate ($P_{TX}$). Interdigital transducers ($R_{X0}$, $R_{X11}$, $R_{X12}$, $R_{X13}$, $R_{X14}$, $R_{X21}$, $R_{X22}$, $R_{X23}$ and $R_{X24}$) are mounted on one end surface of piezoelectric substrate ($P_{RX}$). Interdigital transducers ($T_{Y0}$, $T_{Y1}$ and $T_{Y2}$) are mounted on one end surface of piezoelectric substrate ($P_{TY}$). Interdigital transducers ($R_{Y0}$, $R_{Y11}$, $R_{Y12}$, $R_{Y13}$, $R_{Y14}$, $R_{Y21}$, $R_{Y22}$, $R_{Y23}$ and $R_{Y24}$) are mounted on one end surface of piezoelectric substrate ($P_{RY}$). Two neighboring piezoelectric substrates, for example, piezoelectric substrates ($P_{TX}$ and $P_{TY}$), can be linked to each other. Thus, it is possible to use only one body formed by piezoelectric substrates ($P_{TX}$, $P_{TY}$, $P_{RX}$ and $P_{RY}$). In addition, the interdigital transducers can be mounted on the other end surface of piezoelectric substrates ($P_{TX}$, $P_{RX}$, $P_{TY}$ and $P_{RY}$), that is between nonpiezoelectric plate (1) and piezoelectric substrates ($P_{TX}$, $P_{RX}$, $P_{TY}$ and $P_{RY}$). Interdigital transducers ($T_{X0}$, $R_{X0}$, $T_{Y0}$ and $R_{Y0}$) have the same common-type constructions with an overlap length shorter than that of interdigital transducers ($T_{X1}$, $T_{X2}$, $T_{Y1}$ and $T_{Y2}$) having the same common-type constructions. Interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) have the same constructions. The finger direction of interdigital transducers ($R_{X11}$, $R_{X12}$, $R_{X13}$, $R_{X14}$, $R_{X21}$, $R_{X22}$, $R_{X23}$ and $R_{X24}$) is not parallel to that of interdigital transducers ($T_{X1}$ and $T_{X2}$). The finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is not parallel to that of interdigital transducers ($T_{Y1}$ and $T_{Y2}$).

Figure 3:
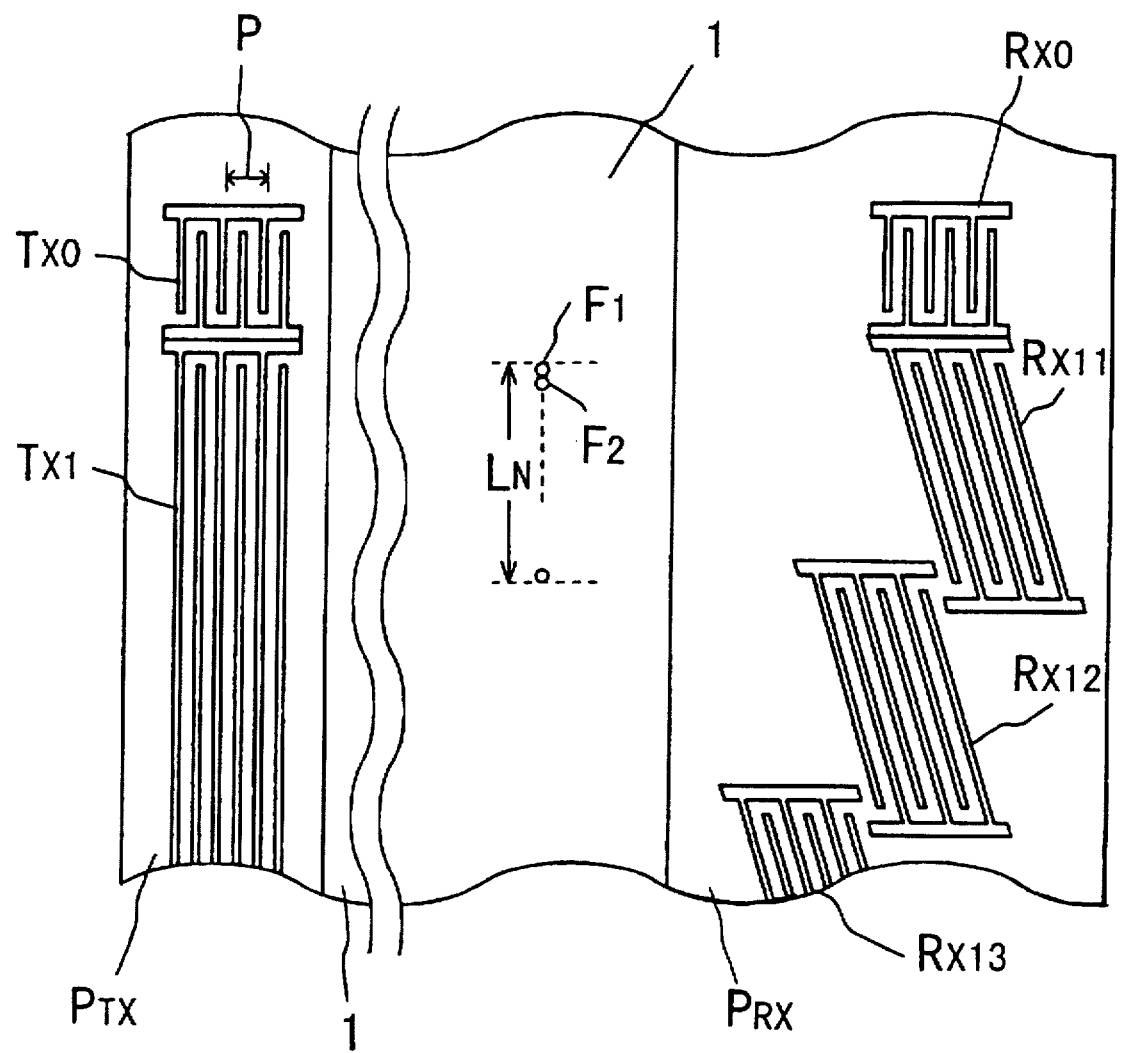
FIG. 3 shows a fragmentary plan view, on an enlarged scale, of the elastic wave position-sensing device in FIG. 1.

FIG. 3 shows a fragmentary plan view, on an enlarged scale, of the elastic wave position-sensing device in FIG. 1. FIG. 3 shows only nonpiezoelectric plate (1), the piezoelectric substrates, and the interdigital transducers consisting of ten finger pairs, respectively. Each of interdigital transducers ($T_{X0}$, $R_{X0}$, $T_{Y0}$ and $R_{Y0}$) has an interdigital periodicity P of 1.6 mm and an overlap length of 1 mm. Each of interdigital transducers ($T_{X1}$, $T_{X2}$, $T_{Y1}$ and $T_{Y2}$) has an interdigital periodicity P of 1.6 mm and an overlap length L of 12 mm. The sum of each overlap length $L_N$, along the finger direction of interdigital transducer ($T_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($T_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($T_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($T_{Y2}$), of interdigital transducers ($R_{Y21}$, $R_{Y22}$, $R_{Y23}$ and $R_{Y24}$) is equal to the overlap length L. In the elastic wave position-sensing device, it is possible to sense a touch with a finger or others on one of positions $F_j$ (j=1, 2, . . . , χ), along the finger direction of interdigital transducer ($T_{X1}$ or $T_{X2}$), within each overlap length $L_N$ of interdigital transducers ($R_{X11}$, $R_{X12}$, $R_{X13}$, $R_{X14}$, $R_{X21}$, $R_{X22}$, $R_{X23}$ and $R_{X24}$) on the upper- or lower end surface of nonpiezoelectric plate (1). In the same way, it is possible to sense a touch with a finger or others on one of positions $F_j$ (j=1, 2, . . . , χ), along the finger direction of interdigital transducer ($T_{Y1}$ or $T_{Y2}$), within each overlap length $L_N$ of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) on the upper- or lower end surface of nonpiezoelectric plate (1).

Figure 4:
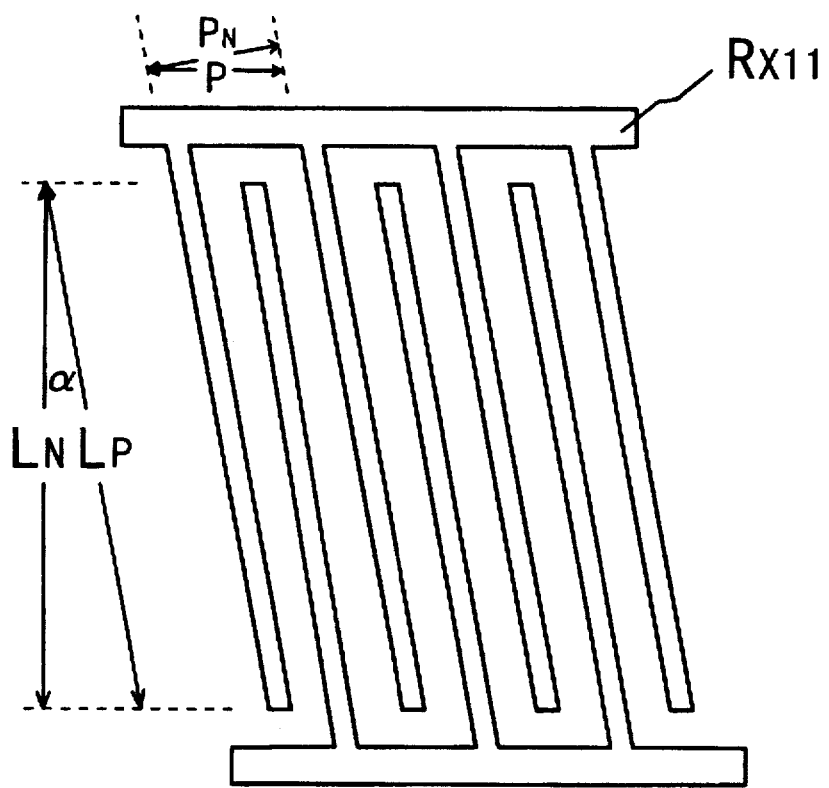
FIG. 4 shows a plan view of interdigital transducer ($R_{X11}$).

FIG. 4 shows a plan view of interdigital transducer ($R_{X11}$). Each of interdigital transducers ($R_{X11}$, $R_{X12}$, $R_{X13}$, $R_{X14}$, $R_{X21}$, $R_{X22}$, $R_{X23}$ and $R_{X24}$) is located such that the finger direction thereof is slanting to that of interdigital transducer ($T_{X1}$ or $T_{X2}$) by an angle α. In the same way, each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is located such that the finger direction thereof is slanting to that of interdigital transducer ($T_{Y1}$ or $T_2$) by an angle α. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is equal to the product of the interdigital periodicity P and cos α. In the same way, an interdigital periodicity $P_N$, along the vertical direction to the finger direction of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is equal to the product of the interdigital periodicity P and cos α. Each overlap length $L_P$, along the finger direction of interdigital transducers ($R_{X11}$, $R_{X12}$, $R_{X13}$ and $R_{X14}$), of interdigital transducers ($R_{X11}$, $R_{X12}$, $R_{X13}$ and $R_{X14}$) is equal to the product of the overlap length $L_N$ and sec α. In other words, the sum of each overlap length $L_P$ of interdigital transducers ($R_{X11}$, $R_{X12}$, $R_{X13}$ and $R_{X14}$) is equal to the product of the overlap length L and sec α. In the same way, the sum of each overlap length $L_P$ of interdigital transducers ($R_{X21}$, $R_{X22}$, $R_{X23}$ and $R_{X24}$) is equal to the product of the overlap length L and sec α. The sum of each overlap length $L_P$ of interdigital transducers ($R_{Y11}$, $R_{Y12}$, $R_{Y13}$ and $R_{Y14}$) is equal to the product of the overlap length L and sec α. The sum of each overlap length $L_P$ of interdigital transducers ($R_{Y21}$, $R_{Y22}$, $R_{Y23}$ and $R_{Y24}$) is equal to the product of the overlap length L and see α.

Figure 5:
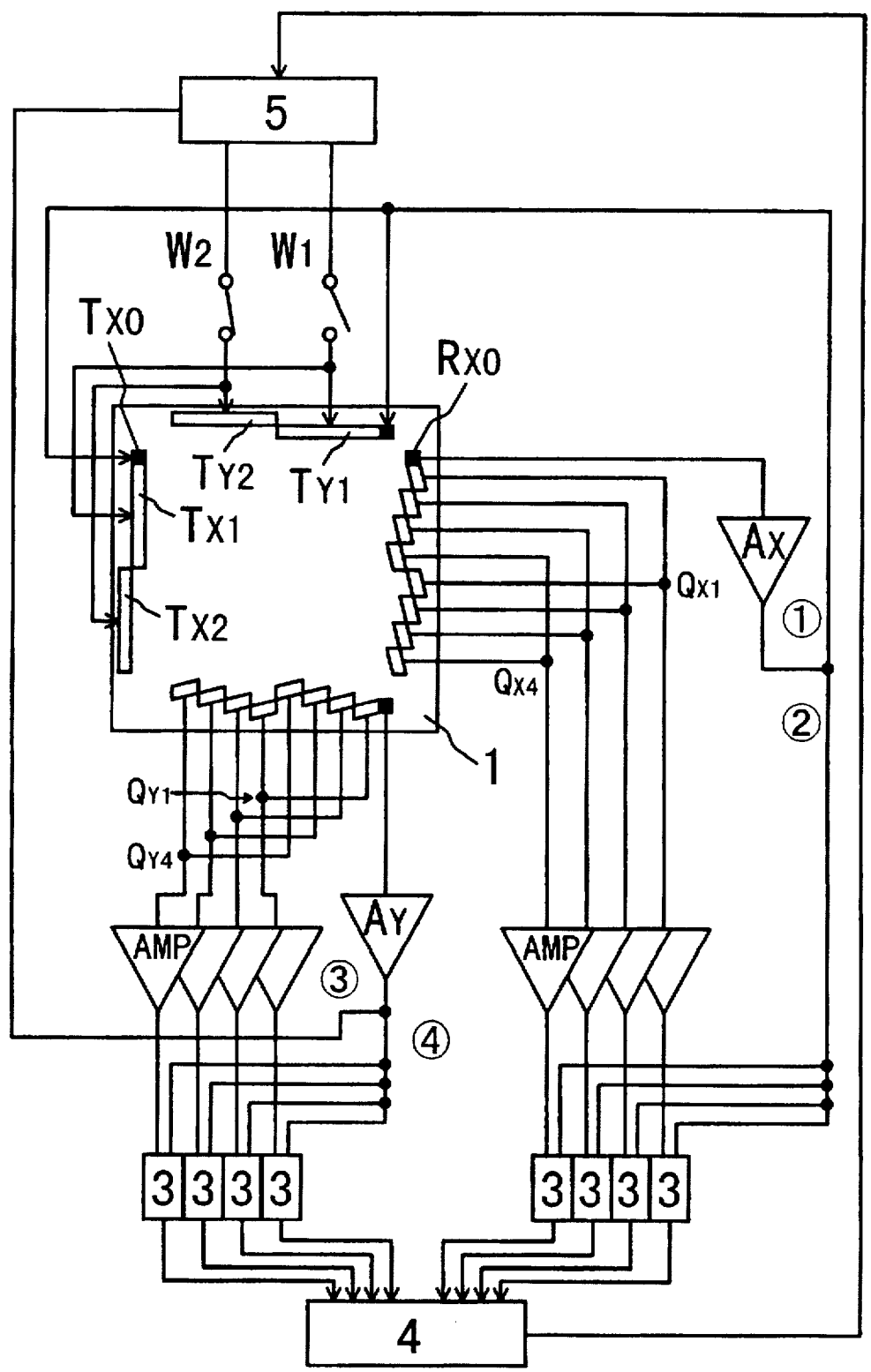
FIG. 5 shows a diagram of a driving circuit of the elastic wave position-sensing device in FIG. 1.

FIG. 5 shows a diagram of a driving circuit of the elastic wave position-sensing device in FIG. 1. Controlling system (2) comprises eight phase comparators (3), computer (4) and switch-change unit (5). Output terminal of switch ($W_1$) is connected with input terminals of interdigital transducers ($T_{X1}$ and $T_{Y1}$). Output terminal of switch ($W_2$) is connected with input terminals of interdigital transducers ($T_{X2}$ and $T_{X2}$). A point $Q_{X1}$ joining output terminals of interdigital transducers $R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X23}$), and a point $Q_{X4}$ joining output terminals of interdigital transducers ($R_{X14}$ and $R_{X24}$) are connected with phase comparators (3) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (3) via amplifiers (AMP), respectively.

In the driving circuit in FIG. 5, when an electric signal having a frequency approximately corresponding to the interdigital periodicity P is applied to interdigital transducers ($T_{X0}$, $T_{X1}$ and $T_{X2}$), respectively, the elastic wave, of the $S_0$ mode and the higher order modes, having the wavelength approximately equal to the interdigital periodicity P is excited in the bilayer zone $B_{TX}$ effectively. In this time, if the phase velocity of the elastic wave of the $S_0$ mode and the higher order modes is approximately equal to the phase velocity $V_{fd=0}$, of the $S_0$ mode elastic wave, corresponding to a condition that the product fd of the frequency f of the elastic wave and the thickness d is zero, the transducing efficiency from the electric signal to the elastic wave increases, and in addition, the reflection caused by the miss-matching on the acoustic impedance at the boundary surface between piezoelectric substrate ($P_{TX}$) and nonpiezoelectric plate (1) never causes. In addition, as piezoelectric substrate ($P_{TX}$) is made from a piezoelectric ceramic having the polarization axis parallel to the thickness direction thereof, the elastic wave of the $S_0$ mode and the higher order modes is excited in the bilayer zone $B_{TX}$ effectively, and the transducing efficiency from the electric signal to the elastic wave increases. If using a piezoelectric polymer such as PVDF and so on, as piezoelectric substrate ($P_{TX}$), the elastic wave of the $S_0$ mode and the higher order modes is excited in the bilayer zone $B_{TX}$ effectively, and the transducing efficiency from the electric signal to the elastic wave increases.

The elastic wave excited in the bilayer zone $B_{TX}$ is transmitted to the bilayer zone $B_{RX}$ through the monolayer zone. As shown in FIG. 1, the thickness d (1 mm) is smaller than the interdigital periodicity P (1.6 mm), and moreover, the thickness (150 μm) of nonpiezoelectric plate (1) is smaller than the thickness d. In this time, it is possible to increase the transmitting efficiency of the elastic wave from the bilayer zone $B_{TX}$ to the bilayer zone $B_{RX}$ on condition that nonpiezoelectric plate (1) is made of a glass such that the phase velocity of the elastic wave traveling on nonpiezoelectric plate (1) alone is higher than that traveling on piezoelectric substrates ($P_{TX}$) and ($P_{RX}$) alone.

The elastic wave excited by interdigital transducer ($T_{X0}$) is transduced to an electric signal with a phase $θ_{base}$ by interdigital transducer ($R_{X0}$), the electric signal being delivered from interdigital transducer ($R_{X0}$) and amplified by amplifier ($A_X$). An electric signal ① is applied to interdigital transducers ($T_{x0}$ and $T_{y0}$). Thus, interdigital transducers ($T_{x0}$ and $R_{x0}$), a propagation lane, as a delay element, of the elastic wave between interdigital transducers ($T_{x0}$ and $R_{x0}$), and amplifier ($A_x$) form an oscillator, causing not only a low voltage operation and low power consumption, but also a small-sized circuit with a simple structure. An electric signal ② is applied to four phase comparators (3).

The elastic wave excited by interdigital transducer ($T_{X1}$) is transduced to electric signals $E_j$ (j=1, 2, ..., χ) with phases $θ_j$ (j=1, 2, ..., χ) by each of interdigital transducers ($R_{X11}$, $R_{X12}$, $R_{X113}$ and $R_{X14}$), the phases $θ_j$ corresponding to the positions $F_j$, respectively. The elastic wave excited by interdigital transducer ($T_{X2}$) is transduced to electric signals $E_j$ (j=1, 2, ..., χ) with phases $θ_j$ (j=1, 2, ..., χ) by each of interdigital transducers ($R_{X21}$, $R_{X22}$, $R_{X23}$ and $R_{X24}$), the phases $θ_j$ corresponding to the positions $F_j$, respectively. Each electric signal $E_j$ has a frequency approximately corresponding to the interdigital periodicity P. The total phase $Σθ_j$ made by phases $θ_j$ is zero. The total electric signal $ΣE_j$ made by electric signals $E_j$ is also zero and is not able to be detected at each of interdigital transducers ($R_{X11}$, $R_{X12}$, $R_{X13}$, $R_{X14}$, $R_{X21}$, $R_{X22}$, $R_{X23}$ and $R_{X24}$).

As mentioned above, the elastic wave excited in the bilayer zone $B_{TX}$ is transmitted to the bilayer zone $B_{RX}$ through the monolayer zone, and is transduced to the electric signal. In this time, if the phase velocity of the elastic wave in the bilayer zone $B_{RX}$ is approximately equal to the phase velocity $V_{fd=0}$, of the $S_0$ mode elastic wave, corresponding to a condition that the product fd of the frequency f of the elastic wave and the thickness d is zero, the transducing efficiency from the elastic wave to the electric signal increases, and in addition, the reflection caused by the miss-matching on the acoustic impedance at the boundary surface between nonpiezoelectric plate (1) and piezoelectric substrate ($P_{RX}$) never causes. In addition, as piezoelectric substrate ($P_{RX}$) is made from a piezoelectric ceramic having the polarization axis parallel to the thickness direction thereof, both the transmitting efficiency of the elastic wave from the bilayer zone $B_{TX}$ to the bilayer zone $B_{RX}$, and the transducing efficiency from the elastic wave to the electric signal increase. If using a piezoelectric polymer such as PVDF and so on, as piezoelectric substrate ($P_{RX}$), both the transmitting efficiency of the elastic wave from the bilayer zone $B_{TX}$ to the bilayer zone $B_{RX}$, and the transducing efficiency from the elastic wave to the electric signal increase.

In the same way as the case of elastic wave transducing unit (X) mentioned above, when an electric signal having a frequency approximately corresponding to the interdigital periodicity P is applied to interdigital transducers ($T_{Y0}$, $T_{Y1}$ and $T_{Y2}$), respectively, the elastic wave, of the $S_0$ mode and the higher order modes, having the wavelength approximately equal to the interdigital periodicity P is excited in the bilayer zone $B_{TY}$ effectively. The elastic wave excited by interdigital transducer ($T_{Y0}$) is transmitted from the bilayer zone $B_{TY}$ to the bilayer zone $B_{RY}$ through the monolayer zone, and is transduced to an electric signal with a phase $θ_{base}$ by interdigital transducer ($R_{Y0}$), the electric signal being delivered from interdigital transducer ($R_{Y0}$) and amplified by amplifier ($A_Y$). An electric signal ③ is applied to switch-change unit (5), and an electric signal ④ is applied to four phase comparators (3). Switch-change unit (5) under a control of computer (4) turns on and off switches ($W_1$ and $W_2$) alternately, and supplies a group of interdigital transducers ($T_{X1}$ and $T_{Y1}$), and a group of interdigital transducers ($T_{X2}$ and $T_{Y2}$) with the electric signal ③ alternately. The elastic wave excited by interdigital transducer ($T_{Y1}$) is transmitted from the bilayer zone $B_{TY}$ to the bilayer zone $B_{RY}$ through the monolayer zone, and is transduced electric signals $E_j$ (j=1, 2, ..., χ) with phases $θ_j$ (j=1, 2, ..., χ) by each of interdigital transducers ($R_{Y11}$, $R_{Y12}$, $R_{Y13}$ and $R_{Y14}$), the phases $θ_j$ corresponding to the positions $F_j$, respectively. The elastic wave excited by interdigital transducer ($T_{Y2}$) is transmitted from the bilayer zone $B_{TY}$ to the bilayer zone $B_{RY}$ through the monolayer zone, and is transduced electric signals $E_j$ (j=1, 2, ..., χ) with phases $θ_j$ (j=1, 2, ..., χ) by each of interdigital transducers ($R_{Y21}$, $R_{Y22}$, $R_{Y23}$ and $R_{Y24}$), the phases $θ_j$ corresponding to the positions $F_j$, respectively. Each electric signal $E_j$ has a frequency approximately corresponding to the interdigital periodicity P. The total phase $Σθ_j$ made by phases $θ_j$ is zero. The total electric signal $ΣE_j$ made by electric signals $E_j$ is also zero and is not able to be detected at each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($T_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the elastic wave in the monolayer zone, respectively, each propagation lane consisting of minute propagation lanes $Z_j$ (j=1, 2, ..., χ) corresponding to the positions $F_j$. Interdigital transducer ($T_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the elastic wave in the monolayer zone, respectively, each propagation lane consisting of minute propagation lanes $Z_j$ (j=1, 2, ..., χ) corresponding to the positions $F_j$. In the same way, interdigital transducer ($T_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the elastic wave in the monolayer zone, respectively, each propagation lane consisting of minute propagation lanes $Z_j$ (j=1, 2, ..., χ) corresponding to the positions $F_j$. Interdigital transducer ($T_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the the elastic wave in the monolayer zone, respectively, each propagation lane consisting of minute propagation lanes $Z_j$ (j=1, 2, ..., χ) corresponding to the positions $F_j$.

When touching a position $F_X$, out of the positions $F_j$, on a minute propagation lane $Z_X$ out of the minute propagation lanes $Z_j$ of one of the propagation lanes ($D_{X11}$, $D_{X12}$, $D_{X13}$, $D_{X14}$, $D_{X21}$, $D_{X22}$, $D_{X23}$ and $D_{X24}$), an electric signal E with a phase θ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the elastic wave on the minute propagation lane $Z_X$ is disappeared and is not transduced to an electric signal $E_X$ with a phase $θ_X$. As a result, the electric signal E being equal to the total electric signal $ΣE_j$ minus the electric signal $E_X$ is delivered from one of interdigital transducers ($R_{X11}$, $R_{X12}$, $R_{X13}$, $R_{X14}$, $R_{X21}$, $R_{X22}$, $R_{X23}$ and $R_{X24}$), the phase θ being equal to the total phase $Σθ_j$ minus the phase $θ_X$, that is ($θ=Σθ_j-θ_X=-θ_X$). Phase comparator (3) detects a difference between the phase θ and the phase $θ_{base}$, only when the phase comparator (3) is applied with the electric signal E. Computer (4) finds the position $F_X$ from the phase difference ($θ_{base}-θ$). In the same way, when touching a position $F_X$ on a minute propagation lane $Z_X$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase θ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the elastic wave on the minute propagation lane $Z_X$ is disappeared and is not transduced to an electric signal $E_X$ with a phase $θ_X$, the electric signal E being equal to the total electric signal $ΣE_j$ minus the electric signal $E_X$, the phase θ being equal to the total phase $\Sigma\theta_j$ minus the phase $\theta_X$. Phase comparator (3) detects a difference between the phase $\theta$ and the phase $\theta_{base}$, only when the phase comparator (3) is applied with the electric signal E. Computer (4) finds the position $F_X$ from the phase difference ($\theta_{base}-\theta$).

As mentioned previously, switch-change unit (5) under a control of computer (4) turns on and off switches ($W_1$ and $W_2$) alternately. At the same time, computer (4) detects switch ($W_1$ or $W_2$) closed when the electric signal E appears at one of the points $Q_{X1}$, $Q_{X2}$, $Q_{X3}$ and $Q_{X4}$. Thus, for example, if switch ($W_2$) is closed when the electric signal E appears at the point $Q_{X3}$, it is clear that the electric signal E is delivered from interdigital transducer ($R_{X23}$). Therefore, it is clear that the touch-position $F_X$ is on the minute propagation lane $Z_X$ out of the propagation lane ($D_{X23}$). In the same way, computer (4) detects switch ($W_1$ or $W_2$) closed when the electric signal E appears at the point $Q_{Y1}$, $Q_{Y2}$, $Q_{Y3}$ and $Q_{Y4}$. For example, if switch ($W_1$) is closed when the electric signal E appears at the point $Q_{Y1}$, it is clear that the touch-position $F_X$ is on the minute propagation lane $Z_X$ out of the propagation lane ($D_{Y11}$). Since eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other, it is clear that the touch-position $F_X$ exists on a crossing point made by the minute propagation lane $Z_X$ out of the propagation lane ($D_{X23}$) and the minute propagation lane $Z_X$ out of the propagation lane ($D_{Y11}$). In addition, eight propagation lanes ($D_{X11}$, $D_{X12}$, $D_{X12}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other. Accordingly, there is no null touch-point on the upper- or lower end surface of nonpiezoelectric plate (1). In order to make no null touch-point, it is also effective to arrange eight propagation lanes ($D_{X11}$, $D_{X12}$, $D_{X13}$, $D_{X14}$, $D_{X21}$, $D_{X22}$, $D_{X23}$ and $D_{X24}$) as they are partially overlapping each other, and arrange eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) as they are partially overlapping each other.

Figure 6:
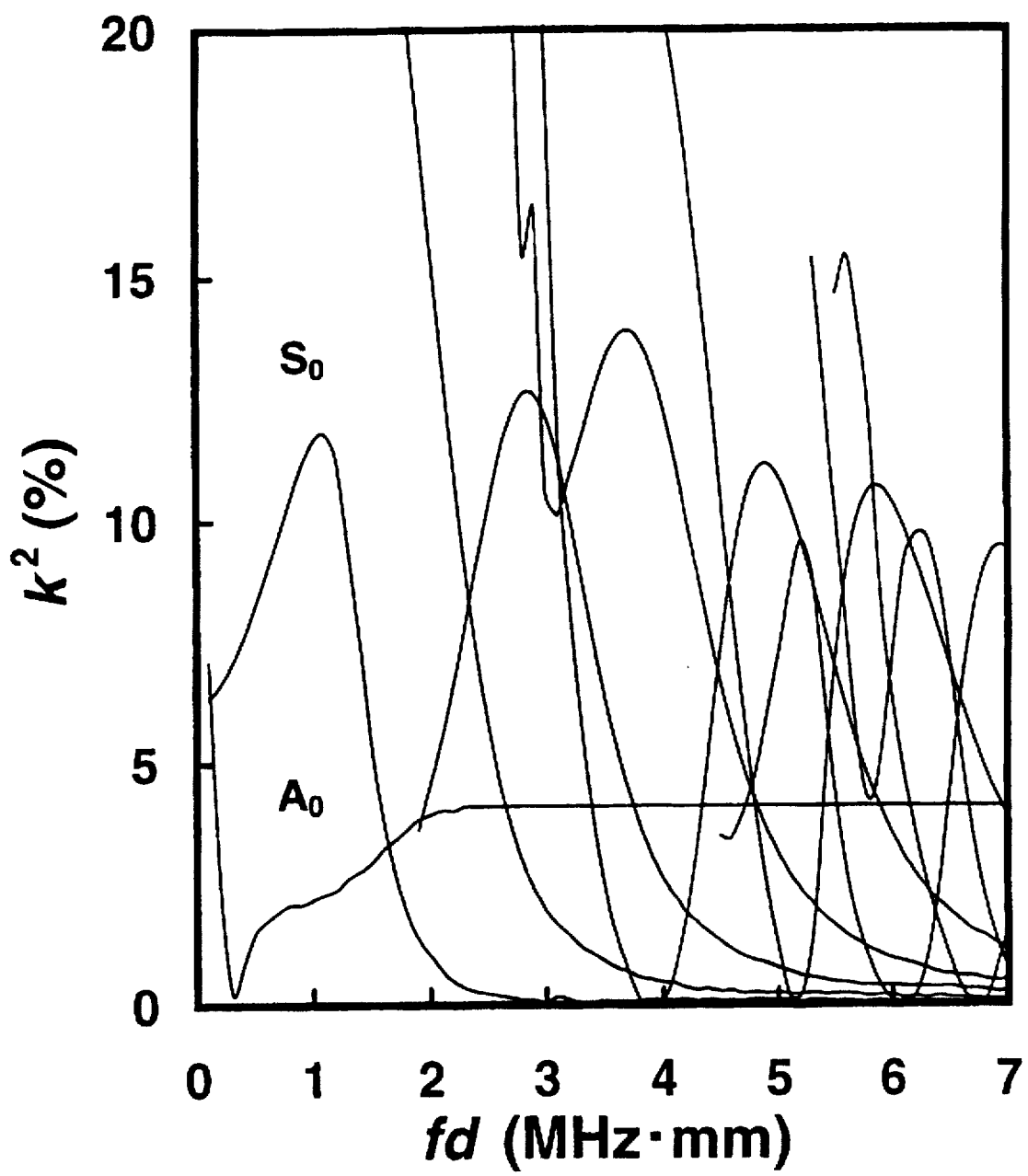
FIG. 6 shows a relationship between the $k^2$ value calculated from the difference between the phase velocity under electrically opened condition and that under electrically shorted condition of piezoelectric substrate ($P_{TX}$) in FIG. 1, and the fd value.

FIG. 6 shows a relationship between the electromechanical coupling constant $k^2$ calculated from the difference between the phase velocity under electrically opened condition and that under electrically shorted condition of piezoelectric substrate ($P_{TX}$) in FIG. 1, and the product fd of the frequency f of the elastic wave and the thickness d of piezoelectric substrate ($P_{TX}$). In FIG. 6, nonpiezoelectric plate (1) is made from a glass having a shear wave velocity ($V_{g-t}$) of 4203 m/s and a longitudinal wave velocity ($V_{g-1}$) of 7604 m/s traveling on the glass alone. The velocities of 4203 m/s and 7604 m/s are about 1.7 times the velocities of a shear- and a longitudinal waves, 2450 m/s and 4390 m/s, respectively, in piezoelectric substrate ($P_{TX}$) alone. The $A_0$ mode elastic wave has the $k^2$ value under 5%. Accordingly, it is clear that the elastic wave of all the modes, except for the $A_0$ mode, that is the elastic wave of the $S_0$ mode and the higher order modes, is excited in the bilayer zone $B_{TX}$ or $B_{TY}$ effectively. An electric energy applied to the input interdigital transducer is most effectively transduced, for example to the $A_2$ mode elastic wave when the fd value is approximately 3.8 MHz·mm, then the $k^2$ value is approximately 14% being the maximum value. It is clear that the $k^2$ value of 14% is worthy in comparison that a crystallized LiNbO$_3$ used as a popular piezoelectric body for exciting a surface acoustic wave generally has the $k^2$ value of approximately 5%.

Figure 7:
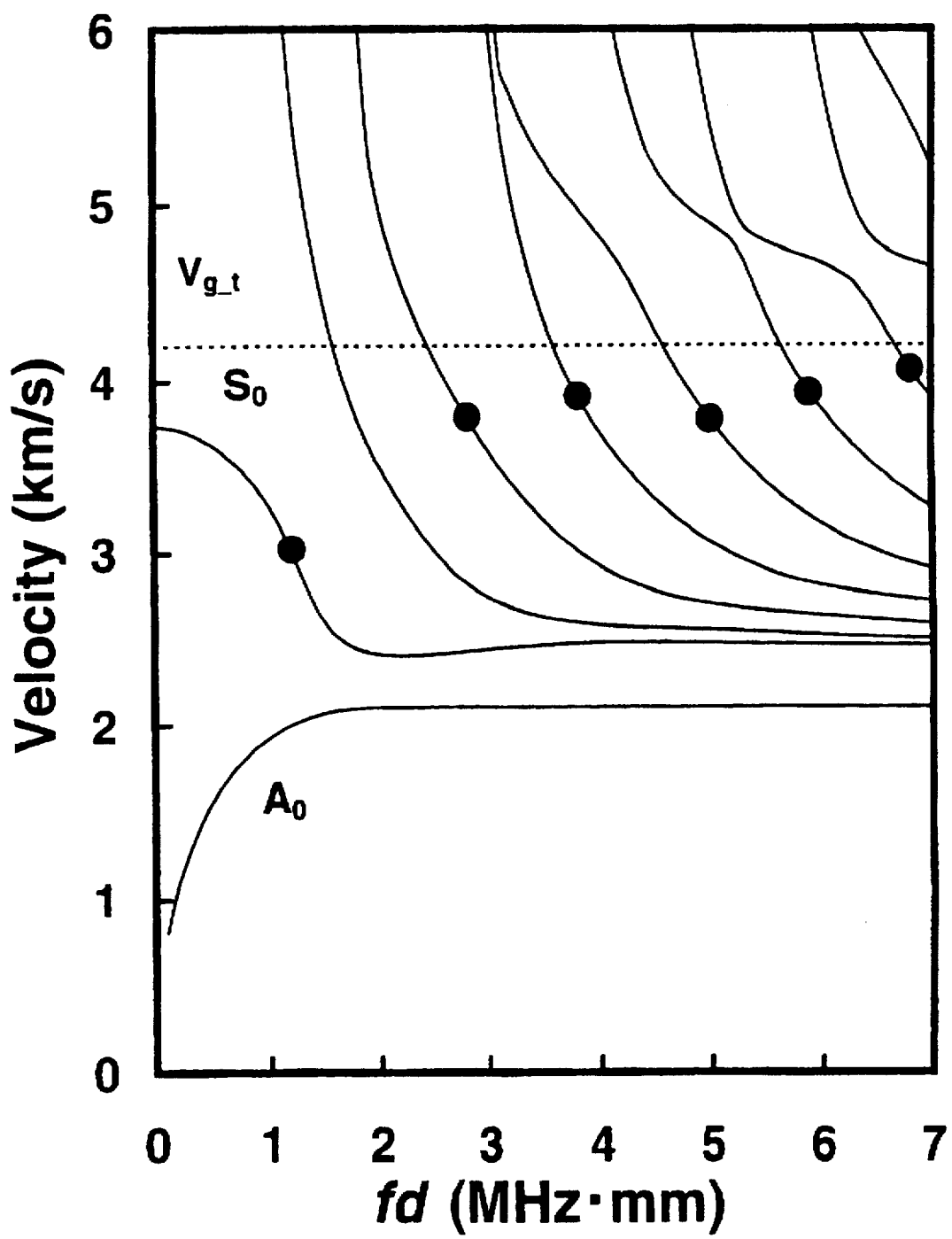
FIG. 7 shows a relationship between the phase velocity of the elastic wave for each mode in the bilayer zone $B_{TX}$, and the fd value.

FIG. 7 shows a relationship between the phase velocity of the elastic wave for each mode in the bilayer zone $B_{TX}$, and the fd value. In FIG. 7, nonpiezoelectric plate (1) is made from the same glass as FIG. 6. The fd value at each mark ● has the maximum $k^2$ value where an electric energy applied to the input interdigital transducer is most easily transduced to the elastic wave, the maximum $k^2$ value being obtained from FIG. 6. The $V_{fd=0}$ value is approximately 3750 m/s, the $V_{fd=0}$ value showing the phase velocity of the $S_0$ mode elastic wave, corresponding to a condition that the product fd of the frequency f of the elastic wave excited in the bilayer zone $B_{TX}$ and the thickness d of piezoelectric substrate ($P_{TX}$) is zero. The phase velocity at each mark ● is approximately equal to the $V_{fd=0}$ value. Thus, the fd value, in which the phase velocity of the elastic wave in the bilayer zone $B_{TX}$ or $B_{TY}$ is approximately equal to the $V_{fd=0}$ value, gives the maximum $k^2$ value.

Figure 8:
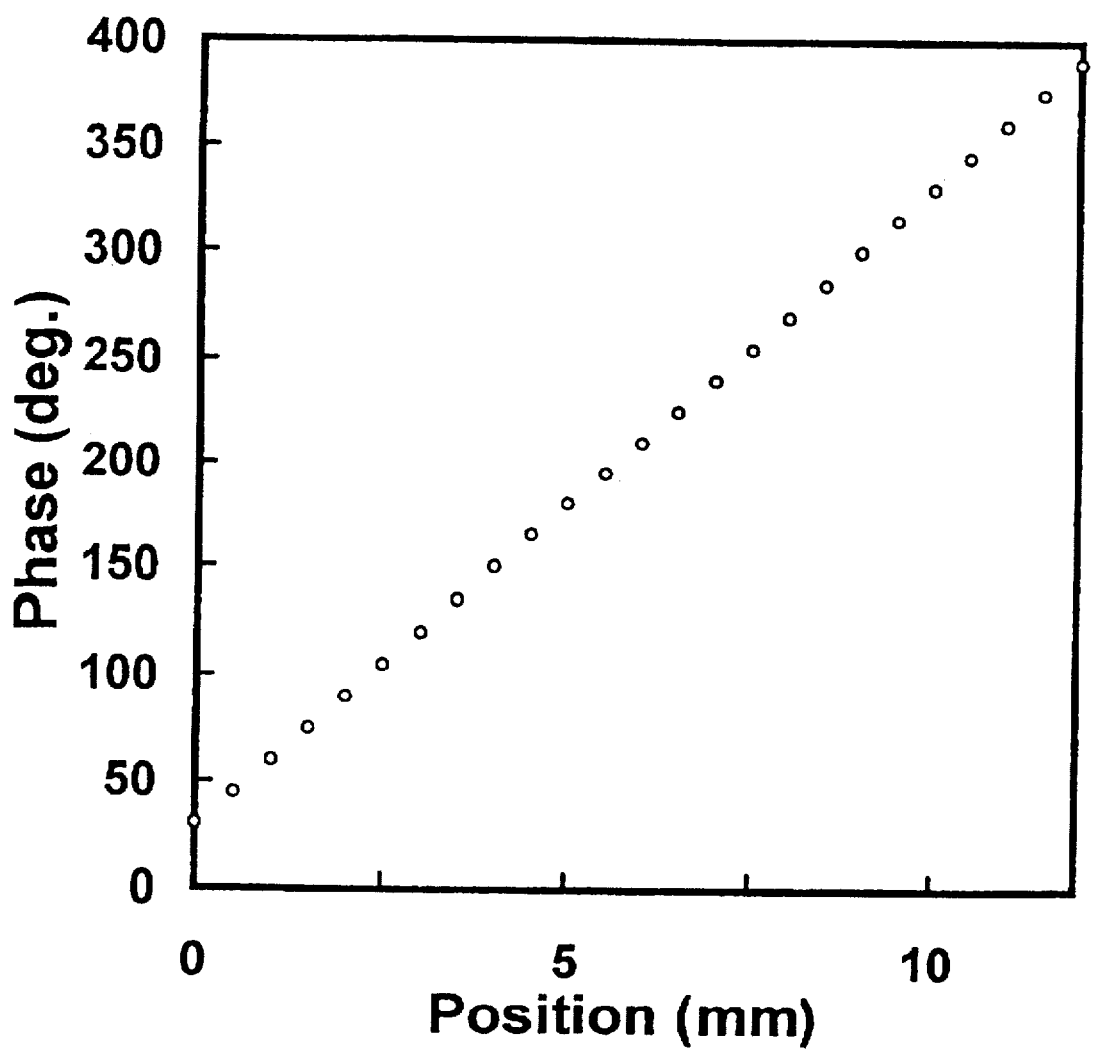
FIG. 8 shows a relationship between a touch-position $F_X$ and a phase difference ($\theta_{base} - \theta$) detected by phase comparator (3).

FIG. 8 shows a relationship between a touch-position $F_X$ and a phase difference ($\theta_{base}-\theta$) detected by phase comparator (3). The distance between the touch-position $F_X$ and a touch-position $F_{X+1}$ is 0.5 mm. There exists a linear relationship between the touch-position $F_X$ and the phase difference ($\theta_{base}-\theta$).

Figure 9:
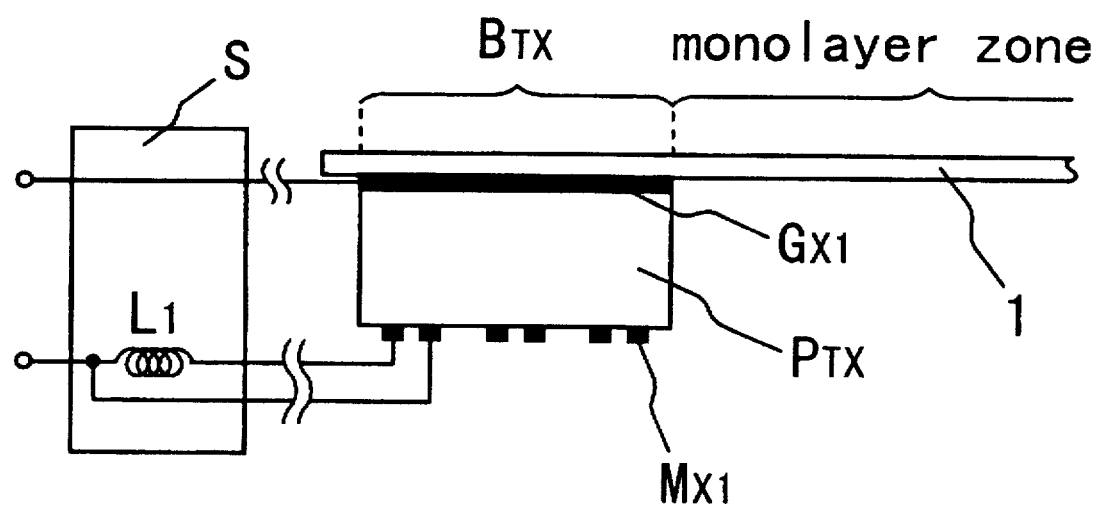
FIG. 9 shows a fragmentary sectional view of an elastic wave position-sensing device according to a second embodiment of the present invention.

FIG. 9 shows a fragmentary sectional view of an elastic wave position-sensing device according to a second embodiment of the present invention. The elastic wave position-sensing device comprises nonpiezoelectric plate (1), controlling system (2), a pair of switches ($W_{11}$ and $W_{12}$), a pair of switches ($W_{21}$ and $W_{22}$), amplifier ($A_X$), earth electrodes ($G_{X1}$, $G_{X2}$, $G_{Y1}$ and $G_{Y2}$) phase shifter (S) and elastic wave transducing units (X and Y). Elastic wave transducing unit (X) in FIG. 9 has the same construction as that in FIG. 1, except for using of interdigital transducers ($M_{X1}$ and $M_{X2}$) in place of interdigital transducers ($T_{X1}$ and $T_{X2}$). Elastic wave transducing unit (Y) in FIG. 9 has the same construction as that in FIG. 1, except for using of interdigital transducers ($M_{Y1}$ and $M_{Y2}$) in place of interdigital transducers ($T_{Y1}$ and $T_{Y2}$). FIG. 9 shows only nonpiezoelectric plate (1), piezoelectric substrate ($P_{TX}$), interdigital transducer ($M_{X1}$), earth electrode ($G_{X1}$) and phase shifter (S) including coil $L_1$. Earth electrodes ($G_{X1}$, $G_{X2}$, $G_{Y1}$, and $G_{Y2}$), made from aluminium thin film, have the same constructions. Earth electrodes ($G_{X1}$ and $G_{X2}$), corresponding with interdigital transducers ($M_{X1}$ and $M_{X2}$), respectively, are formed on the other end surface of piezoelectric substrate ($P_{TX}$). Earth electrodes ($G_{Y1}$ and $G_{Y2}$), corresponding with interdigital transducers ($M_{Y1}$ and $M_{Y2}$), respectively, are formed on the other end surface of piezoelectric substrate ($P_{TY}$).

Figure 10:
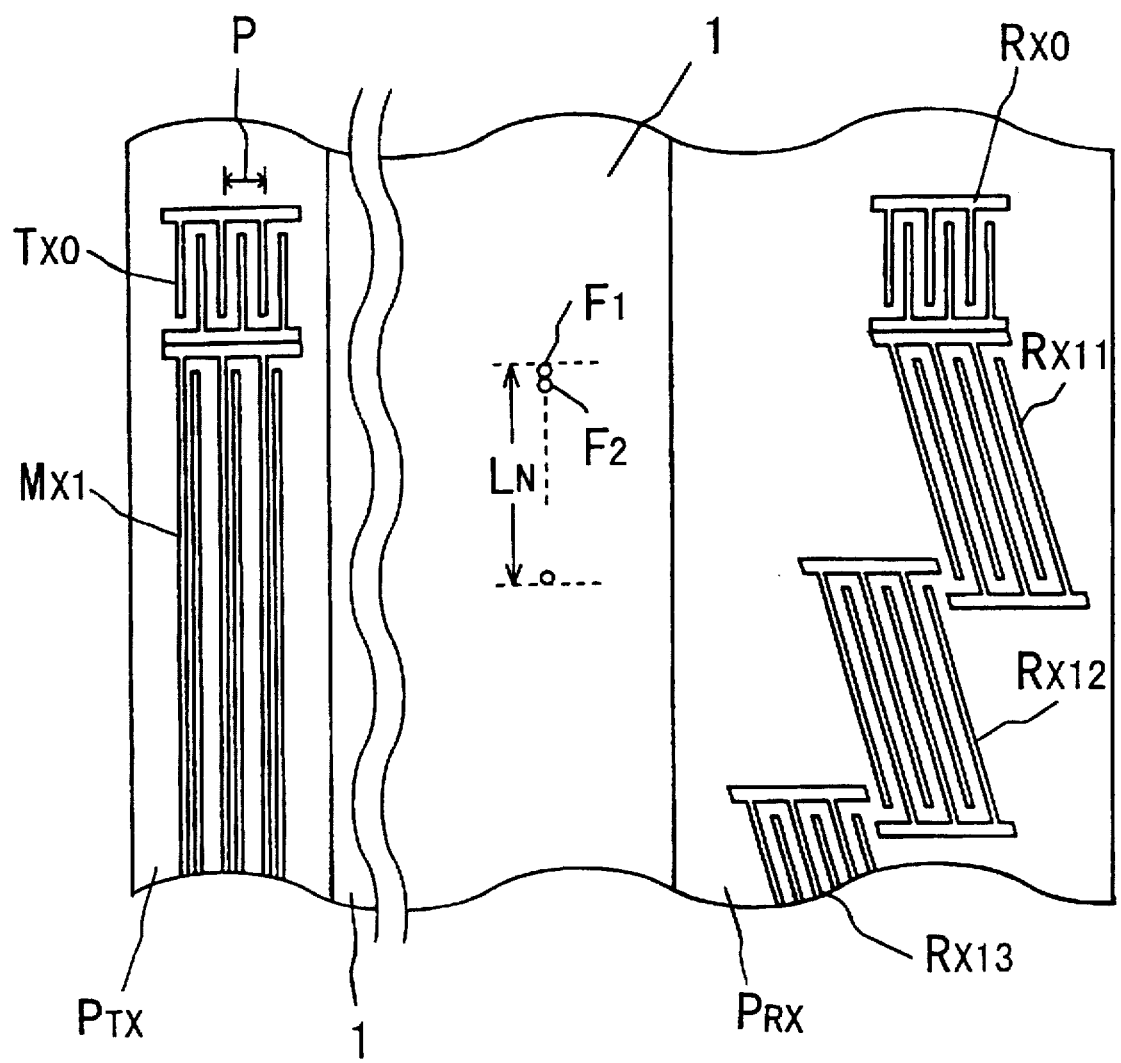
FIG. 10 shows a fragmentary plan view, on an enlarged scale, of the elastic wave position-sensing device in FIG. 9.

FIG. 10 shows a fragmentary plan view, on an enlarged scale, of the elastic wave position-sensing device in FIG. 9. FIG. 10 shows only nonpiezoelectric plate (1), the piezoelectric substrates, and the interdigital transducers. Each of interdigital transducers ($M_{X1}$, $M_{X2}$, $M_{Y1}$ and $M_{Y2}$) consists of ten finger pairs, and has an interdigital periodicity P of 1.6 mm and an overlap length L of 12 mm. The sum of each overlap length $L_N$, along the finger direction of interdigital transducer ($M_{X1}$), of interdigital transducers ($R_{X11}$, $R_{X12}$, $R_{X13}$ and $R_{X14}$) is equal to the overlap length L. The sum of each overlap length $L_N$, along the finger direction of interdigital transducer ($M_{X2}$), of interdigital transducers ($R_{X21}$, $R_{X22}$, $R_{X23}$ and $R_{X24}$) is equal to the overlap length L. The sum of each overlap length $L_N$, along the finger direction of interdigital transducer ($M_{Y1}$), of interdigital transducers ($R_{Y11}$, $R_{Y12}$, $R_{Y13}$ and $R_{Y14}$) is equal to the overlap length L. The sum of each overlap length $L_N$, along the finger direction of interdigital transducer ($M_{Y2}$), of interdigital transducers ($R_{Y21}$, $R_{Y22}$, $R_{Y23}$ and $R_{Y24}$) is equal to the overlap length L. In the elastic wave position-sensing, it is possible to sense a touch on one of positions $F_j$ (j=1, 2, ..., $\chi$), along the finger direction of interdigital transducer ($M_{X1}$ or $M_{X2}$), within each overlap length $L_N$ of interdigital transducers ($R_{X11}$, $R_{X12}$, $R_{X13}$, $R_{X14}$, $R_{X21}$, $R_{X22}$, $R_{X2}3$ and $R_{X24}$) on the upper- or lower end surface of non piezoelectric plate (1). In the same way, it is possible to sense a touch on one of positions $F_j$ (j=1, 2, . . . , χ), along the finger direction of interdigital transducer ($M_{Y1}$ or $M_{Y2}$), within each overlap length $L_N$ of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) on the upper- or lower end surface of non piezoelectric plate (1).

Each of interdigital transducers ($R_{X11}$, $R_{X12}$, $R_{X13}$, $R_{X14}$, $R_{X21}$, $R_{X22}$, $R_{X23}$ and $R_{X24}$) is, as shown in FIG. 4, located such that the finger direction thereof is slanting to that of interdigital transducer ($M_{X1}$ or $M_{X2}$) by an angle α. In the same way, each of interdigital transducers ($R_{Y11}$, $R_{Y12}$, $R_{Y13}$, $R_{Y14}$, $R_{Y21}$, $R_{Y22}$, $R_{Y23}$ and $R_{Y24}$) is located such that the finger direction thereof is slanting to that of interdigital transducer ($M_{Y1}$ and $M_{Y2}$) by an angle α. An interdigital periodicity $P_N$, along the vertical direction to the finger direction of interdigital transducers ($R_{X11}$, $R_{X12}$, $R_{X13}$, $R_{X14}$, $R_{X21}$, $R_{X22}$, $R_{X23}$ and $R_{X24}$) is, as as shown in FIG. 4, equal to the product of the interdigital periodicity P and cos α. In the same way, an interdigital periodicity $P_N$, along the vertical direction to the finger direction of interdigital transducers ($R_{Y11}$, $R_{Y12}$, $R_{Y13}$, $RY_4$, $R_{Y21}$, $R_{Y22}$, $R_{Y23}$ and $R_{Y24}$) is equal to the product of the interdigital periodicity P and cos α. The sum of each overlap length $L_P$ of interdigital transducers ($R_{X11}$, $R_{X12}$, $R_{X13}$ and $R_{X14}$) is equal to the product of the overlap length L and sec α. In the same way, the sum of each overlap length $L_P$ of interdigital transducers ($R_{X21}$, $R_{X22}$, $R_{X23}$ and $R_{X24}$) is equal to the product of the overlap length L and sec α. The sum of each overlap length $L_P$ of interdigital transducers ($R_{Y11}$, $R_{Y12}$, $R_{Y13}$ and $R_{Y14}$) is equal to the product of the overlap length L and sec α. The sum of each overlap length $L_P$ of interdigital transducers ($R_{Y21}$, $R_{Y22}$, $R_{Y23}$ and $R_{Y24}$) is equal to the product of the overlap length L and sec α.

Figure 11:
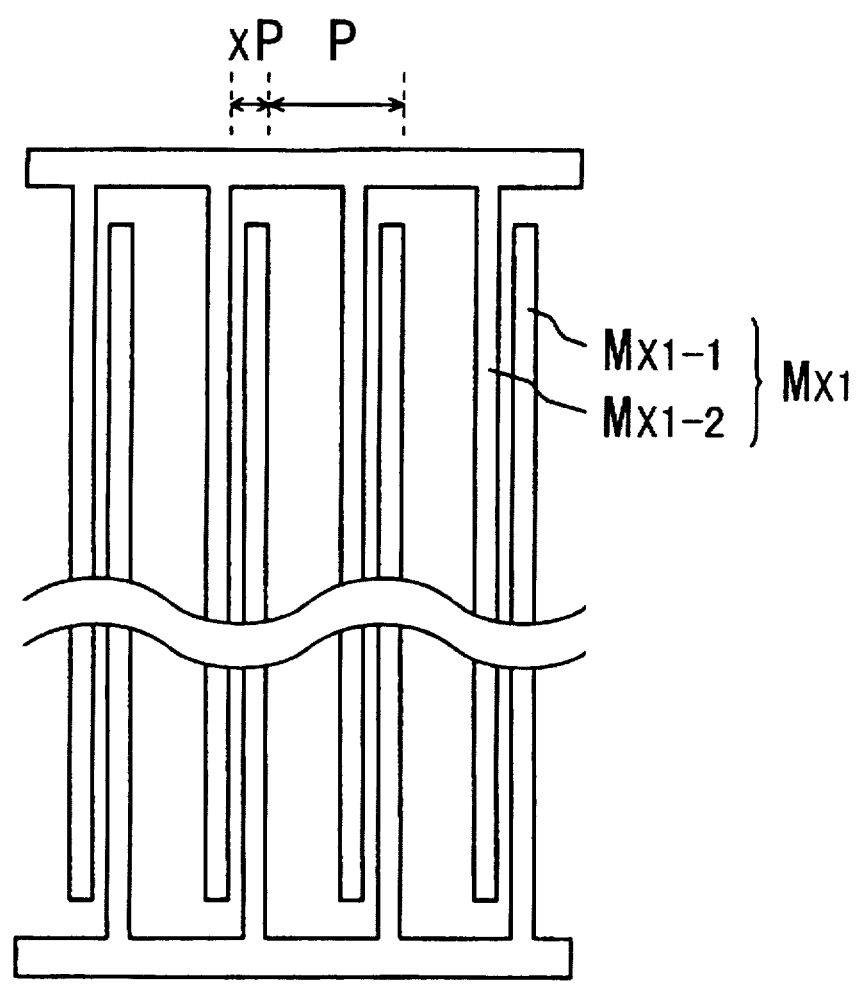
FIG. 11 shows a plan view of interdigital transducer ($M_{X1}$).

FIG. 11 shows a plan view of interdigital transducer ($M_{X1}$). Interdigital transducer ($M_{X1}$) consists of two electrodes ($M_{X1-1}$ and $M_{X1-2}$), and has two kinds of distances between one electrode finger of electrode ($M_{X1-1}$) and two neighboring electrode fingers of electrode ($M_{X1-2}$), a shorter distance xP of the two kinds of distances being 400 μm. Interdigital transducers ($M_{X1}$, $M_{X2}$, $M_{Y1}$ and $M_{Y2}$), made from aluminium thin film, have the same constructions each other.

Figure 12:
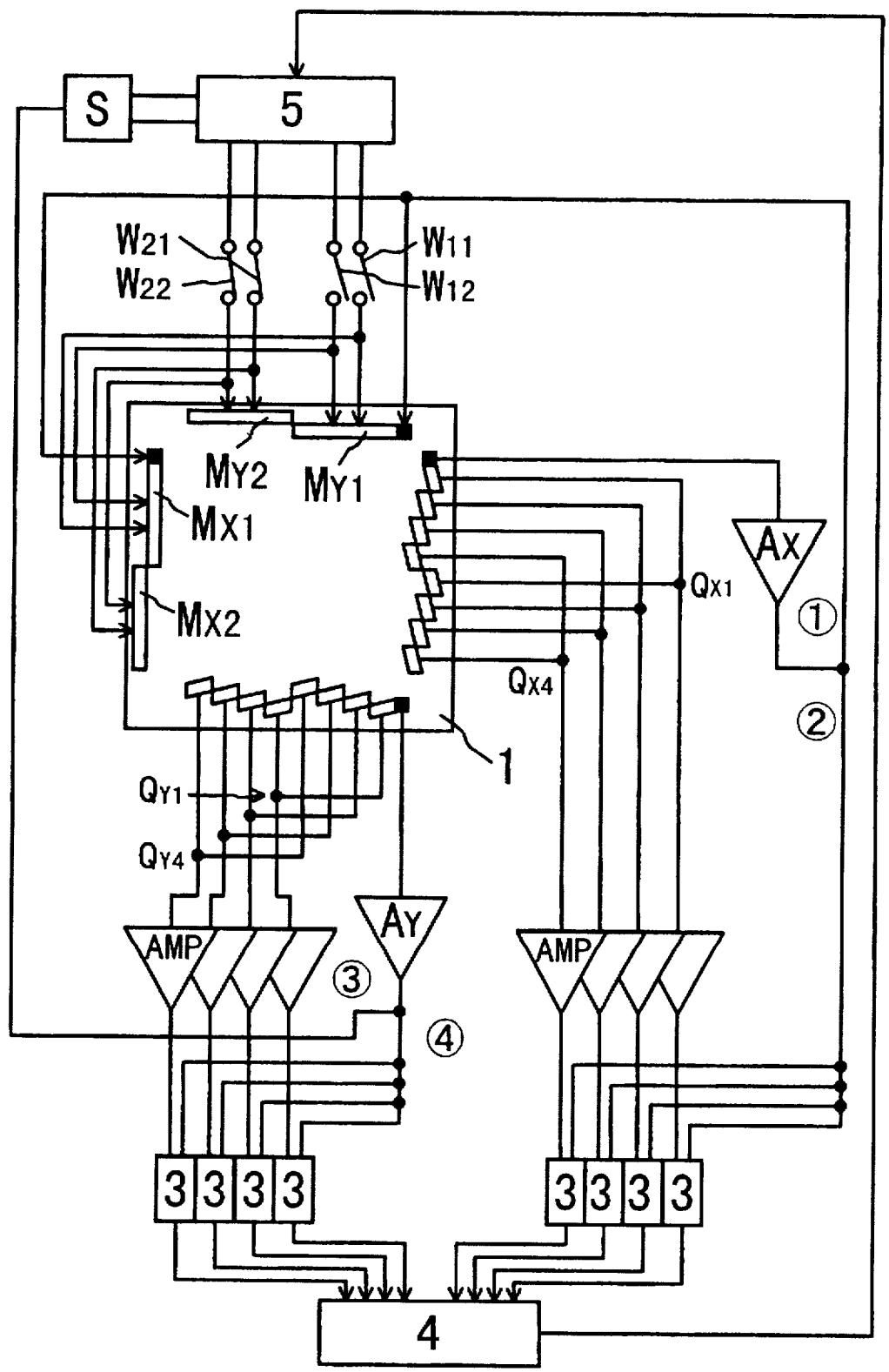
FIG. 12 shows a diagram of a driving circuit of the elastic wave position-sensing device in FIG. 9.

FIG. 12 shows a diagram of a driving circuit of the elastic wave position-sensing device in FIG. 9. Controlling system (2) comprises eight phase comparators (3), computer (4) and switch-change unit (5). Output terminal of switch ($W_{11}$) is connected with input terminals of interdigital transducers ($M_{X1-1}$ and $M_{Y1-1}$). Output terminal of switch ($W_{12}$) is connected with input terminals of interdigital transducers ($M_{X1-2}$ and $M_{Y1-2}$). Output terminal of switch ($W_{21}$) is connected with input terminals of interdigital transducers ($M_{X2-1}$ and $M_{Y2-1}$). Output terminal of switch ($W_{22}$) is connected with input terminals of interdigital transducers ($M_{X2-2}$ and $M_{Y2-2}$). A point $Q_{X1}$ joining output terminals of interdigital transducers ($R_{X11}$ and $R_{X21}$), a point $Q_{X2}$ joining output terminals of interdigital transducers ($R_{X12}$ and $R_{X22}$), a point $Q_{X3}$ joining output terminals of interdigital transducers ($R_{X13}$ and $R_{X23}$), and a point $Q_{X4}$ joining output terminals of interdigital transducers ($R_{X14}$ and $R_{X24}$) are connected with phase comparators (3) via amplifiers (AMP), respectively. In the same way, a point $Q_{Y1}$ joining output terminals of interdigital transducers ($R_{Y11}$ and $R_{Y21}$), a point $Q_{Y2}$ joining output terminals of interdigital transducers ($R_{Y12}$ and $R_{Y22}$), a point $Q_{Y3}$ joining output terminals of interdigital transducers ($R_{Y13}$ and $R_{Y23}$), and a point $Q_{Y4}$ joining output terminals of interdigital transducers ($R_{Y14}$ and $R_{Y24}$) are connected with phase comparators (3) via amplifiers (AMP), respectively.

Interdigital transducers ($T_{X0}$, $R_{X0}$, $T_{Y0}$ and $R_{Y0}$) in FIG. 12 have the same function as that in FIG. 5. In addition, interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$) in FIG. 12 have the same function as that in FIG. 5.

In the driving circuit in FIG. 12, electric signals $V_1$ and $V_2$, with a frequency approximately corresponding to the interdigital periodicity P and having the phase difference 2πy, are applied between electrode ($M_{X1-1}$) and earth electrode ($G_{X1}$), and between electrode ($M_{X1-2}$) and earth electrode ($G_{X1}$), respectively. In this time, an unidirectional elastic wave, of the $S_0$ mode and the higher order modes, having the wavelength approximately equal to the interdigital periodicity P is excited in the bilayer zone $B_{TX}$, on condition that x<½ in the shorter distance xP of interdigital transducer ($M_{X1}$), and x+y=±½ in the phase difference 2πy. If x=¼, y=¼ or y=−¾. Thus, the unidirectional elastic wave is excited in the bilayer zone $B_{TX}$, on condition that xP=400 μm as shown in FIG. 11, and 2πy=π/2(90°) or 2πy=−3π/2 (−270°). The excitation of the unidirectional elastic wave generates no reflection of an elastic wave at the side surface of the bilayer zone $B_{TX}$, so that seldom or never makes a noise. In addition, the excitation of the unidirectional elastic wave reduces a waste of an electric energy applied to interdigital transducer ($M_{X1}$), causing the elastic wave position-sensing device in FIG. 9 to be operated under low power consumption with low voltage.

As mentioned above, the unidirectional elastic wave is excited in the bilayer zone $B_{TX}$ by interdigital transducer ($M_{X1}$) and earth electrode ($G_{X1}$). In the same way, an unidirectional elastic wave is excited in the bilayer zone $B_{TX}$ by interdigital transducer ($M_{X2}$) and earth electrode ($G_{X2}$). An unidirectional elastic wave is excited in the bilayer zone $B_{TY}$ by interdigital transducer ($M_{Y1}$) and earth electrode ($G_{Y1}$). An unidirectional elastic wave is excited in the bilayer zone $B_{TY}$ by interdigital transducer ($M_{Y2}$) and earth electrode ($G_{Y2}$). An electric signal ③ is applied to switch-change unit (5) via phase shifter (S). Switch-change unit (5) under a control of computer (4) turns on and off the pair of switches ($W_{11}$ and $W_{12}$) and the pair of switches ($W_{21}$ and $W_{22}$) alternately, and supplies a group of interdigital transducers ($M_{X1}$ and $M_{Y1}$) and a group of interdigital transducers ($M_{X2}$ and $M_{Y2}$) with the electric signal ③ alternately. In this time, switches ($W_{11}$ and $W_{12}$) are in the same condition each other, and switches ($W_{21}$ and $W_{22}$) are in the same condition each other.

The elastic wave excited by interdigital transducer ($M_{X1}$) is transduced to electric signals $E_j$ (j=1, 2, . . . , χ) with phases $\theta_j$ (j=1, 2, . . . , χ) by each of interdigital transducers ($R_{X11}$, $R_{X12}$, $R_{X13}$ and $R_{X14}$). The elastic wave excited by interdigital transducer ($M_{X2}$) is transduced to electric signals $E_j$ (j=1, 2, . . . , χ) with phases $\theta_j$ (j=1, 2, . . . , χ) by each of interdigital transducers ($R_{X21}$, $R_{X22}$, $R_{X23}$ and $R_{X24}$). The elastic wave excited by interdigital transducer ($M_{Y1}$) is transduced to electric signals $E_j$ (j=1, 2, . . . , χ) with phases $\theta_j$ (j=1, 2, . . . , χ) by each of interdigital transducers ($R_{Y11}$, $R_{Y12}$, $R_{Y13}$ and $R_{Y14}$). The elastic wave excited by interdigital transducer ($M_{Y2}$) is transduced to electric signals $E_j$ (j=1, 2, . . . , χ) with phases $\theta_j$ (j=1, 2, . . . , χ) by each of interdigital transducers ($R_{Y21}$, $R_{Y22}$, $R_{Y23}$ and $R_{Y24}$). The phases $\theta_j$ correspond to the positions $F_j$, respectively. Each electric signal $E_j$ has a frequency approximately corresponding to the interdigital periodicity P. The total phase Σ$\theta_j$ made by the phases $\theta_j$ is zero. The total electric signal $\Sigma E_j$ made by the electric signals $E_j$ is also zero and is not able to be detected at each of interdigital transducers ($R_{X11}$, $R_{X12}$, $R_{X13}$, $R_{X14}$, $R_{X21}$, $R_{X22}$, $R_{X23}$, $R_{X24}$, $R_{Y11}$, $R_{Y12}$, $R_{Y13}$, $R_{Y14}$, $R_{Y21}$, $R_{Y22}$, $R_{Y23}$ and $R_{Y24}$).

Interdigital transducer ($M_{X1}$) and interdigital transducers ($R_{X11}$, $R_{X12}$, $R_{X13}$ and $R_{X14}$) form four propagation lanes ($D_{X11}$, $D_{X12}$, $D_{X13}$ and $D_{X14}$) of the the elastic wave in the monolayer zone, respectively. Interdigital transducer ($M_{X2}$) and interdigital transducers ($R_{X21}$, $R_{X22}$, $R_{X23}$ and $R_{X24}$) form four propagation lanes ($D_{X21}$, $D_{X22}$, $D_{X23}$ and $D_{X24}$) of the the elastic wave in the monolayer zone, respectively. Interdigital transducer ($M_{Y1}$) and interdigital transducers ($R_{Y11}$, $R_{Y12}$, $R_{Y13}$ and $R_{Y14}$) form four propagation lanes ($D_{Y11}$, $D_{Y12}$, $D_{Y13}$ and $D_{Y14}$) of the the elastic wave in the monolayer zone, respectively. Interdigital transducer ($M_{Y2}$) and interdigital transducers ($R_{Y21}$, $R_{Y22}$, $R_{Y23}$ and $R_{Y24}$) form four propagation lanes ($D_{Y21}$, $D_{Y22}$, $D_{Y23}$ and $D_{Y24}$) of the the elastic wave in the monolayer zone, respectively. Each of propagation lanes ($D_{X11}$, $D_{X12}$, $D_{X13}$, $D_{X14}$, $D_{X21}$, $D_{X22}$, $D_{X23}$, $D_{X24}$, $D_{Y11}$, $D_{Y12}$, $D_{Y13}$, $D_{Y14}$, $D_{Y21}$, $D_{Y22}$, $D_{Y23}$ and $D_{Y24}$) consists of minute propagation lanes $Z_j$ (j=1, 2, ..., $\chi$) corresponding to the positions $F_j$. Eight propagation lanes ($D_{X11}$, $D_{X12}$, $D_{X13}$, $D_{X14}$, $D_{X21}$, $D_{X22}$, $D_{X23}$ and $D_{X24}$) and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) cross each other. In addition, eight propagation lanes ($D_{X11}$, $D_{X12}$, $D_{X13}$, $D_{X14}$, $D_{X21}$, $D_{X22}$, $D_{X23}$ and $D_{X24}$) are closed each other, and eight propagation lanes ($D_{Y11}$, $D_{Y12}$, $D_{Y13}$, $D_{Y14}$, $D_{Y21}$, $D_{Y22}$, $D_{Y23}$ and $D_{Y24}$) are also closed each other.

When touching a position $F_X$, out of the positions $F_j$ in FIG. 10, on a minute propagation lane $Z_X$ out of the minute propagation lanes $Z_j$ of one of the propagation lanes ($D_{X11}$, $D_{X12}$, $D_{X13}$, $D_{X14}$, $D_{X21}$, $D_{X22}$, $D_{X23}$ and $D_{X24}$), an electric signal E with a phase $\theta$ is delivered from one of interdigital transducers ($R_{X11}$, $R_{X12}$, $R_{X13}$, $R_{X14}$, $R_{X21}$, $R_{X22}$, $R_{X23}$ and $R_{X24}$). In this time, only the elastic wave on the minute propagation lane $Z_X$ is disappeared and is not transduced to an electric signal $E_X$ with a phase $\theta_X$, the electric signal E being equal to the total electric signal $\Sigma E_j$ minus the electric signal $E_X$, the phase $\theta$ being equal to the total phase $\Sigma \theta_j$ minus the phase $\theta_X$. Phase comparator (3) detects a difference between the phase $\theta$ and the phase $\theta_{base}$, only when the phase comparator (3) is applied with the electric signal E. Computer (4) finds the position $F_X$ from the phase difference ($\theta_{base}-\theta$). In the same way, when touching a position $F_X$ on a minute propagation lane $Z_X$ out of one of the propagation lanes ($D_{Y11}$, $D_{Y12}$, $D_{Y13}$, $D_{Y14}$, $D_{Y21}$, $D_{Y22}$, $D_{Y23}$ and $D_{Y24}$), an electric signal E with a phase $\theta$ is delivered from one of interdigital transducers ($R_{Y11}$, $R_{Y12}$, $R_{Y13}$, $R_{Y14}$, $R_{Y21}$, $R_{Y22}$, $R_{Y23}$ and $R_{Y24}$). In this time, only the elastic wave on the minute propagation lane $Z_X$ is disappeared and is not transduced to an electric signal $E_X$ with a phase $\theta_X$, the electric signal E being equal to the total electric signal $\Sigma E_j$ minus the electric signal $E_X$, the phase $\theta$ being equal to the total phase $\Sigma \theta_j$ minus the phase $\theta_X$. Phase comparator (3) detects a difference between the phase $\theta$ and the phase $\theta_{base}$, only when the phase comparator (3) is applied with the electric signal E. Computer (4) finds the position $F_X$ from the phase difference ($\theta_{base}-\theta$).

As mentioned previously, switch-change unit (5) under a control of computer (4) in FIG. 12 turns on and off the pair of switches ($W_{11}$ and $W_{12}$) and the pair of switches ($W_{21}$ and $W_{22}$) alternately. At the same time, computer (4) detects the pair of switches ($W_{11}$ and $W_{12}$) or the pair of switches ($W_{21}$ and $W_{22}$) closed when the electric signal E appears at one of the points $Q_{X1}$, $Q_{X2}$, $Q_{X3}$ and $Q_{X4}$. In the same way, computer (4) detects the pair of switches ($W_{11}$ and $W_{12}$) or the pair of switches ($W_{21}$ and $W_{22}$) closed when the electric signal E appears at the point $Q_{Y1}$, $Q_{Y2}$, $Q_{Y3}$ and $Q_{Y4}$. Thus, for example, if the pair of switches ($W_{21}$ and $W_{22}$) is closed when the electric signal E appears at the point $Q_{X3}$, it is clear that the electric signal E is delivered from interdigital transducer ($R_{X23}$). On the other hand, if the pair of switches ($W_{11}$ and $W_{12}$) is closed when the electric signal E appears at the point $Q_{Y1}$, it is clear that the electric signal E is delivered from interdigital transducer ($R_{Y11}$). Accordingly, it is clear that the touch-position $F_X$ exists on a crossing point made by the minute propagation lane $Z_X$ out of the propagation lane ($D_{X23}$) and the minute propagation lane $Z_X$ out of the propagation lane ($D_{Y11}$).

Compared with the elastic wave position-sensing device according to the first embodiment, the elastic wave position-sensing device according to the second embodiment can be operated under still lower power consumption owing to the excitation of the unidirectional elastic wave. In addition, no reflection of an elastic wave generates at the side surface of the bilayer zones in the elastic wave position-sensing device according to the second embodiment, because of the excitation of the unidirectional elastic wave. Therefore, the elastic wave position-sensing device according to the second embodiment has little or no noise, so that has a still higher sensitivity.

Figure 13:
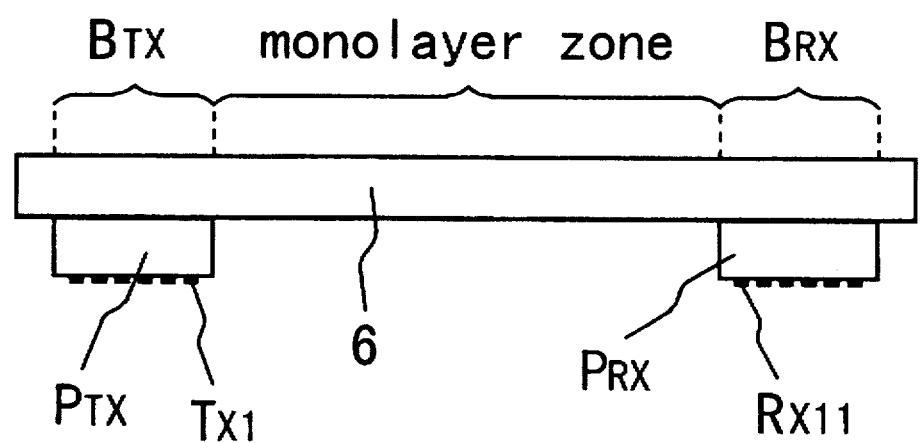
FIG. 13 shows a fragmentary sectional view of an elastic wave position-sensing device according to a third embodiment of the present invention.

FIG. 13 shows a fragmentary sectional view of an elastic wave position-sensing device according to a third embodiment of the present invention. The elastic wave position-sensing device in FIG. 13 has the same construction as the elastic wave position-sensing device in FIG. 1, except for using of non piezoelectric plate (6) in place of non piezoelectric plate (1). FIG. 13 shows only nonpiezoelectric plate (6), piezoelectric substrates ($P_{TX}$ and $P_{RX}$), and interdigital transducers ($T_{X1}$ and $R_{X11}$). Non piezoelectric plate (6), of which material is glass, has a dimension of 1 mm in thickness. The elastic wave position-sensing device according to the third embodiment is operated in the same way as the elastic wave position-sensing device according to the first embodiment, and has the same function as the elastic wave position-sensing device according to the first embodiment. As shown in FIG. 13, the thickness d (1 mm) is smaller than the interdigital periodicity P (1.6 mm), and moreover, the thickness (1 mm) of nonpiezoelectric plate (6) is equal to the thickness d. Therefore, it is possible to increase the transmitting efficiency of the elastic wave from the bilayer zone $B_{TX}$ to the bilayer zone $B_{RX}$ on condition that nonpiezoelectric plate (6) is made of a glass such that the phase velocity of the elastic wave traveling on nonpiezoelectric plate (6) alone is equal to that traveling on piezoelectric substrates ($P_{TX}$) and ($P_{RX}$) alone.

Figure 14:
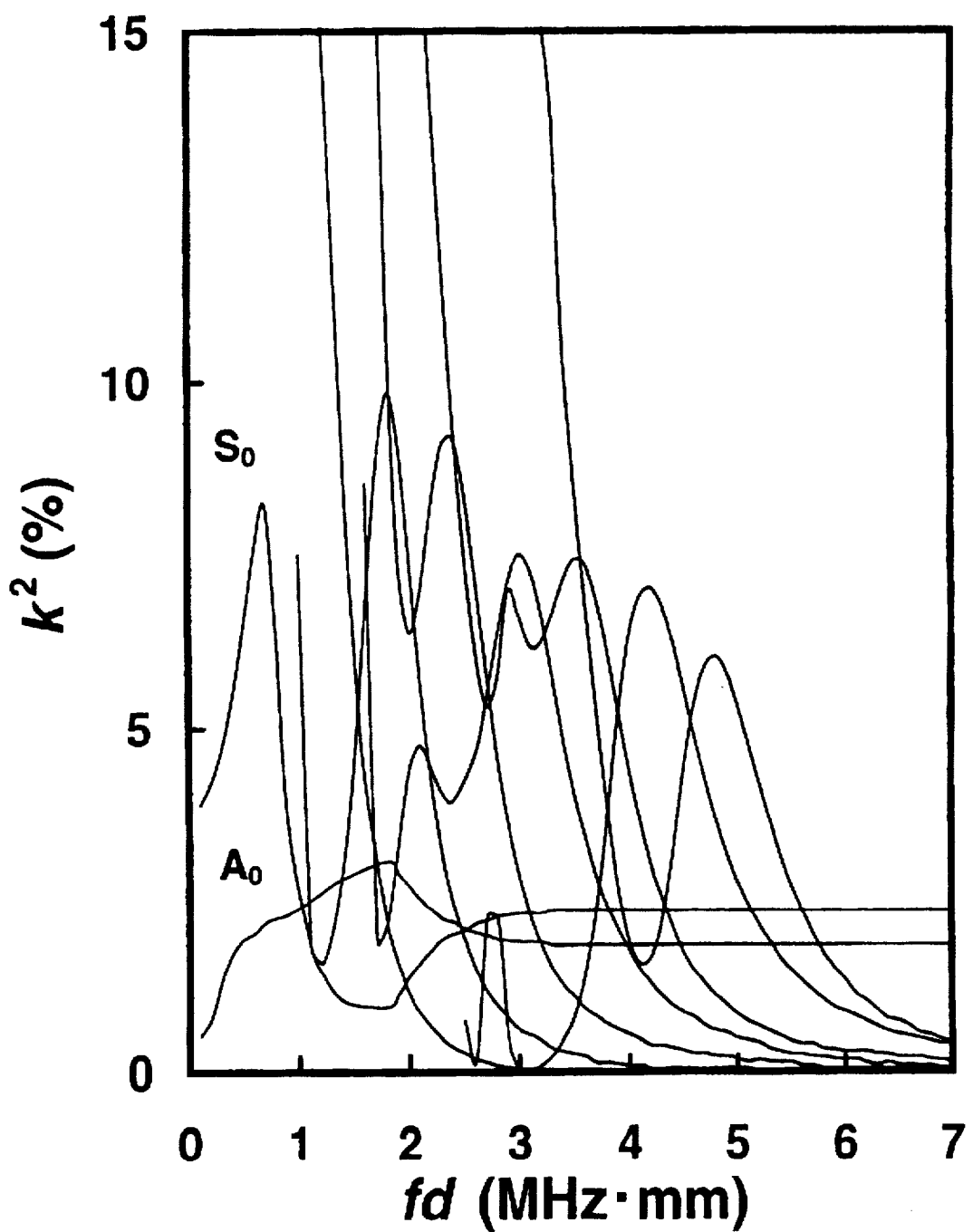
FIG. 14 shows a relationship between the $k^2$ value calculated from the difference between the phase velocity under electrically opened condition and that under electrically shorted condition of piezoelectric substrate ($P_{TX}$) in FIG. 13, and the fd value.

FIG. 14 shows a relationship between the $k^2$ value calculated from the difference between the phase velocity under electrically opened condition and that under electrically shorted condition of piezoelectric substrate ($P_{TX}$) in FIG. 13, and the fd value. In FIG. 14, nonpiezoelectric plate (6) is made from a glass having a shear wave velocity ($V_{g-t}$) of 2297 m/s and a longitudinal wave velocity ($V_{g-1}$) of 4155 m/s traveling the glass alone. The velocities of 2297 m/s and 4155 m/s are approximately equal to the velocities of a shear- and a longitudinal waves, 2450 m/s and 4390 m/s, respectively, in piezoelectric substrate ($P_{TX}$) alone. The $A_0$ mode elastic wave has the $k^2$ value under 5%. Accordingly, it is clear that the elastic wave of all the modes, except for the $A_0$ mode, that is the elastic wave of the $S_0$ mode and the higher order modes, is excited in the bilayer zone $B_{TX}$ or $B_{TY}$ effectively. An electric energy applied to the input interdigital transducer is most effectively transduced, for example to the $S_1$ mode elastic wave when the fd value is approximately 1.8 MHz·mm, then the $k^2$ value is approximately 9.5% being the maximum value.

Figure 15:
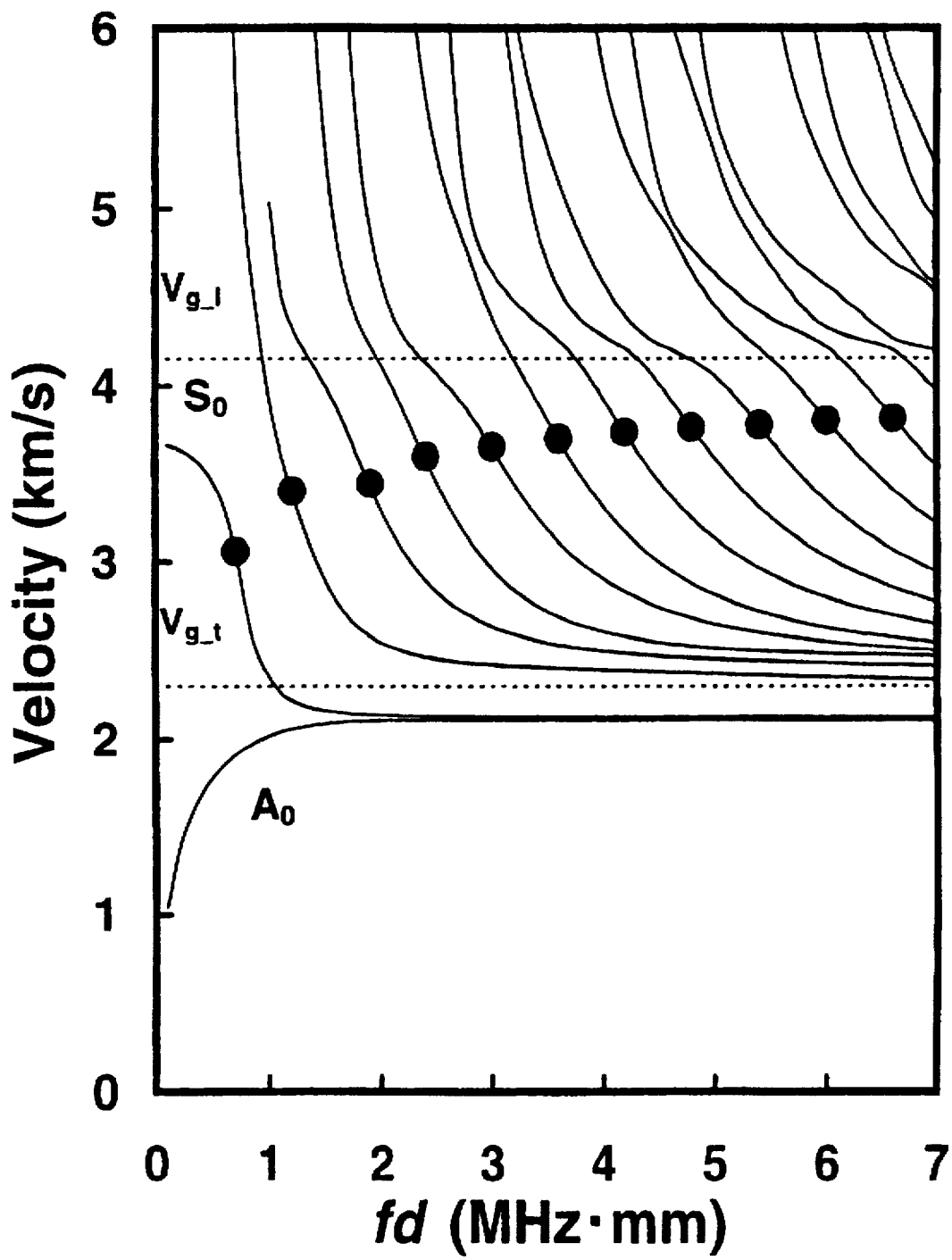
FIG. 15 shows a relationship between the phase velocity of the elastic wave for each mode in the bilayer zone $B_{TX}$ in FIG. 13, and the fd value.

FIG. 15 shows a relationship between the phase velocity of the elastic wave for each mode in the bilayer zone $B_{TX}$ in FIG. 13, and the fd value. In FIG. 15, nonpiezoelectric plate (6) is made from the same glass as FIG. 14. The fd value at each mark ● has the maximum $k^2$ value where an electric energy applied to the input interdigital transducer is most easily transduced to the elastic wave, the maximum $k^2$ value being obtained from FIG. 14. The $V_{fd=0}$ value is approximately 3670 m/s, the $V_{fd=0}$ value showing the phase velocity of the $S_0$ mode elastic wave, corresponding to a condition that the product fd of the frequency f of the elastic wave excited in the bilayer zone $B_{TX}$ and the thickness d of piezoelectric substrate ($P_{TX}$) is zero. The phase velocity at each mark ● is approximately equal to the $V_{fd=0}$ value. Thus, the fd value, in which the phase velocity of the elastic wave in the bilayer zone $B_{TX}$ or $B_{TY}$ is approximately equal to the $V_{fd=0}$ value, gives the maximum $k^2$ value.

Figure 16:
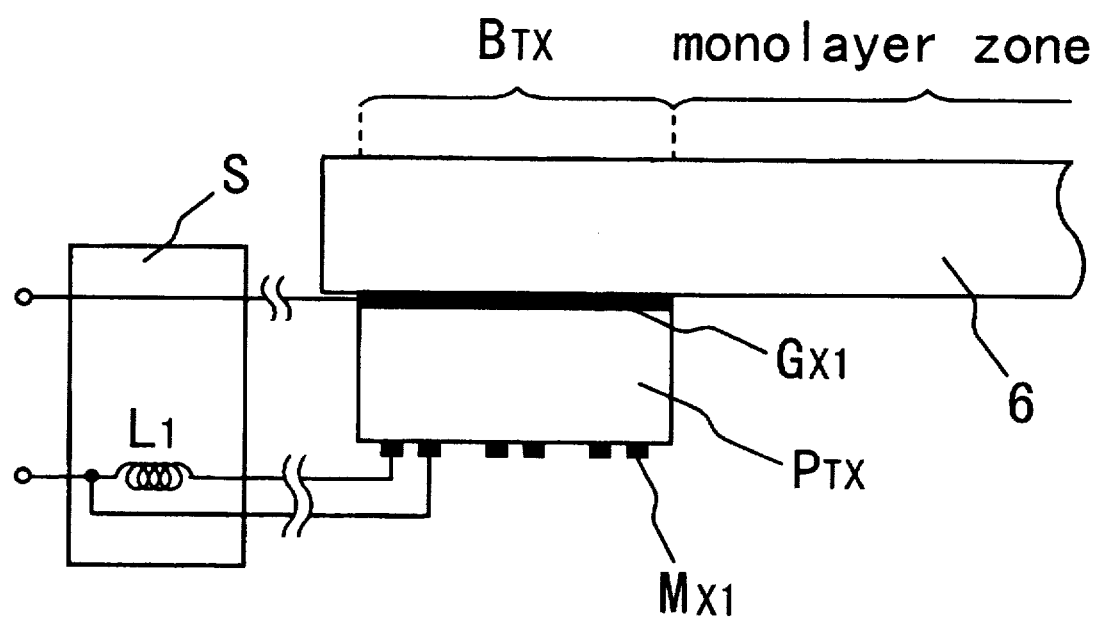
FIG. 16 shows a fragmentary sectional view of an elastic wave position-sensing device according to a fourth embodiment of the present invention.

FIG. 16 shows a fragmentary sectional view of an elastic wave position-sensing device according to a fourth embodiment of the present invention. The elastic wave position-sensing device in FIG. 16 has the same construction as the elastic wave position-sensing device in FIG. 9, except for using of non piezoelectric plate (6) in place of non piezoelectric plate (1). FIG. 16 shows only nonpiezoelectric plate (6), piezoelectric substrate ($P_{TX}$), interdigital transducer ($M_{X1}$), earth electrode ($G_{X1}$) and phase shifter (S). The elastic wave position-sensing device according to the fourth embodiment is operated in the same way as the elastic wave position-sensing device according to the second embodiment, and has the same function as the elastic wave position-sensing device according to the second embodiment.

Compared with the elastic wave position-sensing device according to the third embodiment, the elastic wave position-sensing device according to the fourth embodiment can be operated under still lower power consumption owing to the excitation of the unidirectional elastic wave. In addition, no reflection of an elastic wave generates at the side surface of the bilayer zones in the elastic wave position-sensing device according to the fourth embodiment, because of the excitation of the unidirectional elastic wave. Therefore, the elastic wave position-sensing device according to the fourth embodiment has little or no noise, so that has a still higher sensitivity.

Figure 17:
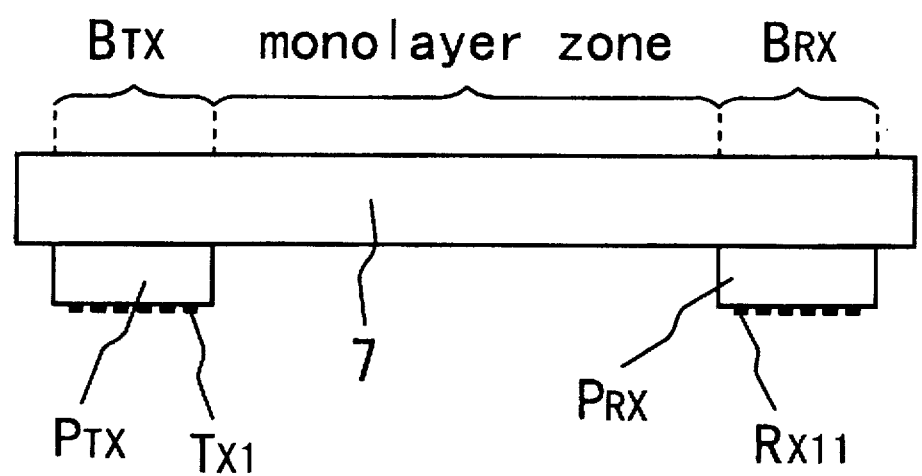
FIG. 17 shows a fragmentary sectional view of an elastic wave position-sensing device according to a fifth embodiment of the present invention.

FIG. 17 shows a fragmentary sectional view of an elastic wave position-sensing device according to a fifth embodiment of the present invention. The elastic wave position-sensing device in FIG. 17 has the same construction as the elastic wave position-sensing device in FIG. 1, except for using of non piezoelectric plate (7) in place of non piezoelectric plate (1). FIG. 17 shows only nonpiezoelectric plate (7), piezoelectric substrates ($P_{TX}$ and $P_{RX}$), and interdigital transducers ($T_{X1}$ and $R_{X11}$). Non piezoelectric plate (7), of which material is glass, has a dimension of 1.5 mm in thickness. The elastic wave position-sensing device according to the fifth embodiment is operated in the same way as the elastic wave position-sensing device according to the first embodiment, and has the same function as the elastic wave position-sensing device according to the first embodiment. As shown in FIG. 17, the thickness d (1 mm) is smaller than the interdigital periodicity P (1.6 mm), and moreover, the thickness (1.5 mm) of nonpiezoelectric plate (7) is larger than the thickness d. Therefore, it is possible to increase the transmitting efficiency of the elastic wave from the bilayer zone $B_{TX}$ to the bilayer zone $B_{RX}$ on condition that nonpiezoelectric plate (7) is made of a glass such that the phase velocity of the elastic wave traveling on nonpiezoelectric plate (7) alone is lower than that traveling on piezoelectric substrates ($P_{TX}$) and ($P_{RX}$) alone.

Figure 18:
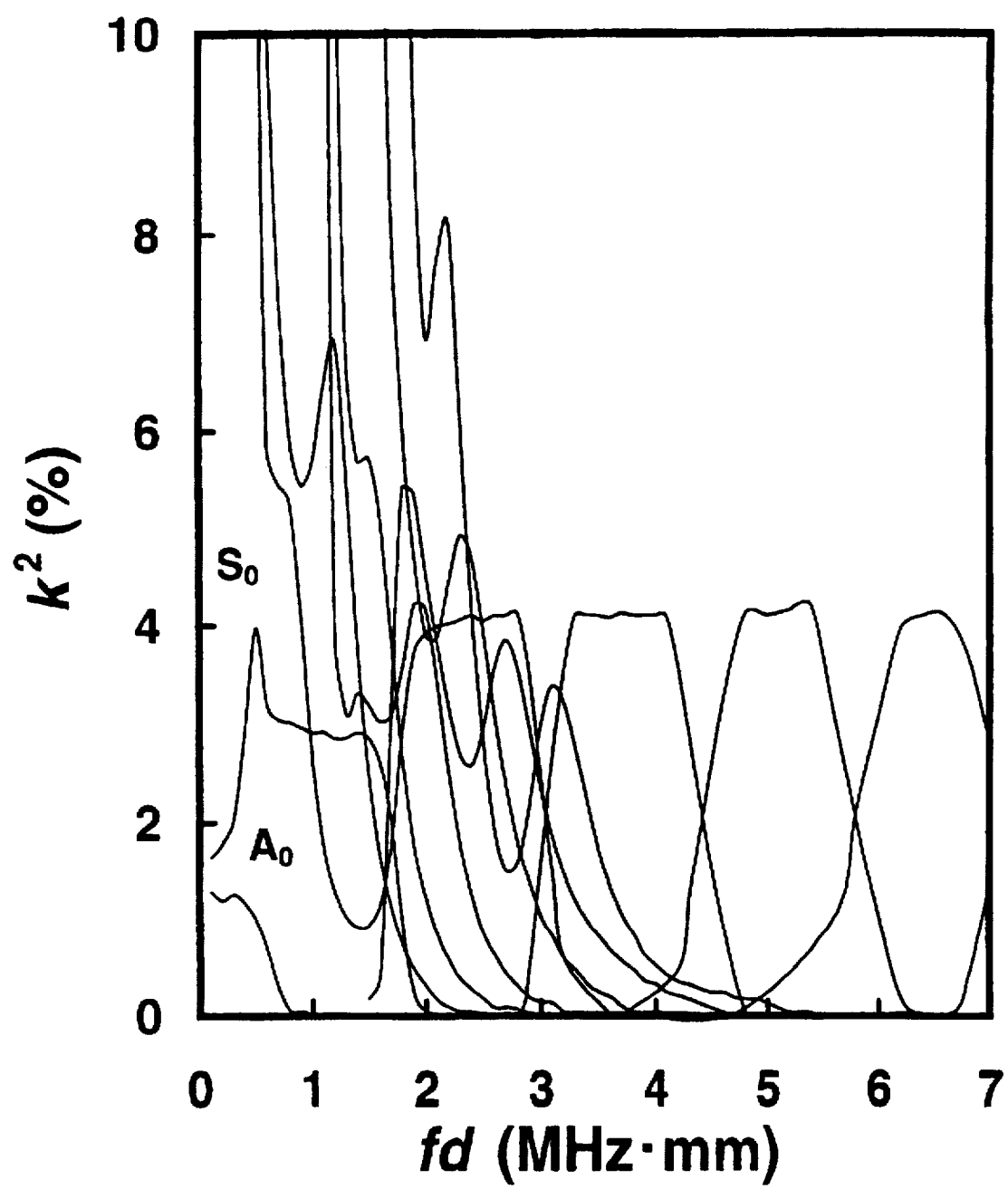
FIG. 18 shows a relationship between the $k^2$ value calculated from the difference between the phase velocity under electrically opened condition and that under electrically shorted condition of piezoelectric substrate ($P_{TX}$) in FIG. 17, and the fd value.

FIG. 18 shows a relationship between the $k^2$ value calculated from the difference between the phase velocity under electrically opened condition and that under electrically shorted condition of piezoelectric substrate ($P_{TX}$) in FIG. 17, and the fd value. In FIG. 18, nonpiezoelectric plate (7) is made from a glass having a shear wave velocity ($V_{g-t}$) of 1988 m/s and a longitudinal wave velocity ($V_{g-1}$) of 3597 m/s traveling the glass alone. The velocities of 1988 m/s and 3597 m/s are about 0.8 times the velocities of a shear- and a longitudinal waves. 2450 m/s and 4390 m/s, respectively, in piezoelectric substrate ($P_{TX}$) alone. The $A_0$ mode elastic wave has the $k^2$ value under 5%. Accordingly, it is clear that the elastic wave of all the modes, except for the $A_0$ mode, that is the elastic wave of the $S_0$ mode and the higher order modes, is excited in the bilayer zone $B_{TX}$ or $B_{TY}$ effectively.

Figure 19:
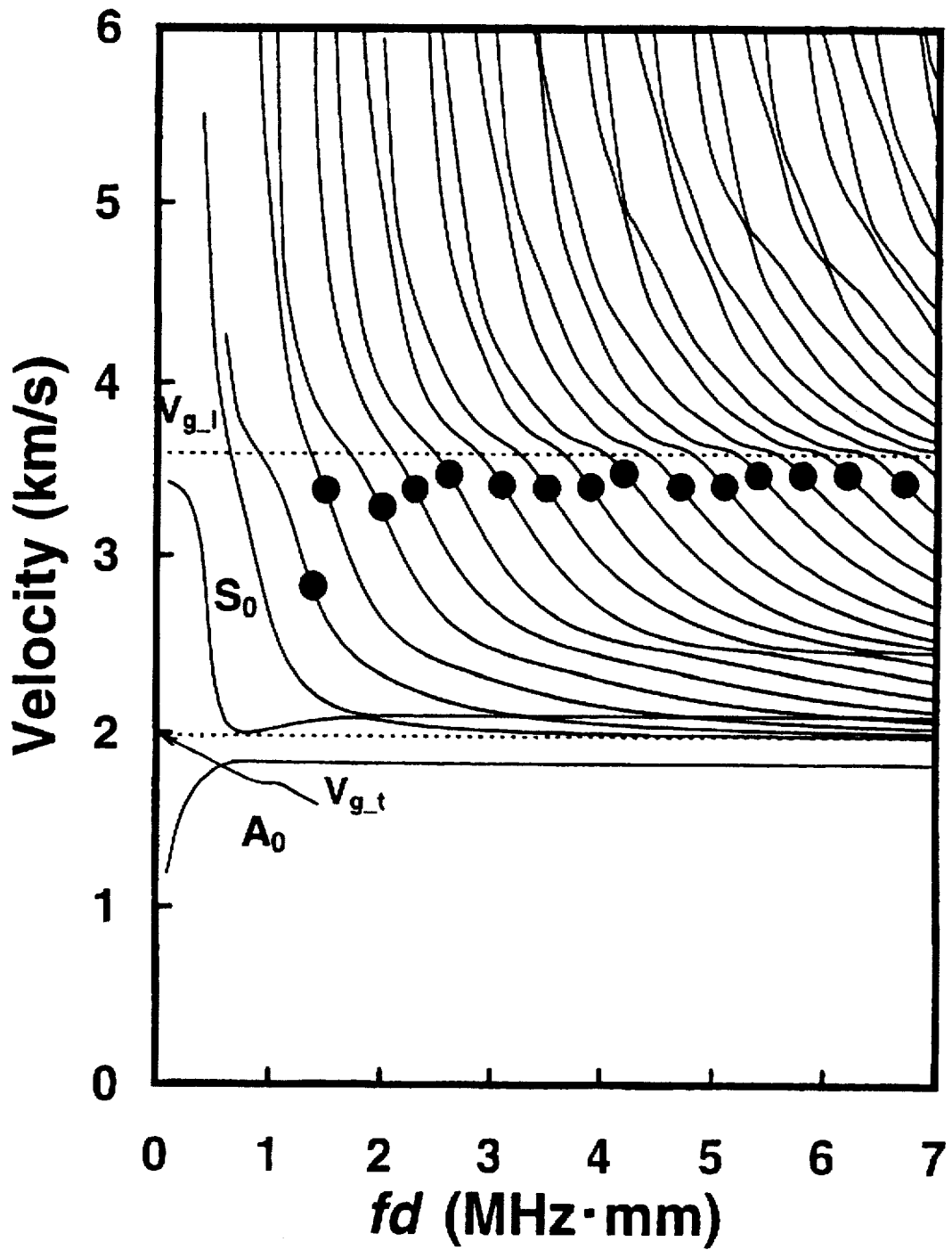
FIG. 19 shows a relationship between the phase velocity of the elastic wave for each mode in the bilayer zone $B_{TX}$ in FIG. 17, and the fd value.

FIG. 19 shows a relationship between the phase velocity of the elastic wave for each mode in the bilayer zone $B_{TX}$ in FIG. 17, and the fd value. In FIG. 19, nonpiezoelectric plate (7) is made from the same glass as FIG. 18. The fd value at each mark ● has the maximum $k^2$ value where an electric energy applied to the input interdigital transducer is most easily transduced to the elastic wave, the maximum $k^2$ value being obtained from FIG. 18. The $V_{fd=0}$ value is approximately 3500 m/s, the $V_{fd=0}$ value showing the phase velocity of the $S_0$ mode elastic wave, corresponding to a condition that the product fd of the frequency f of the elastic wave excited in the bilayer zone $B_{TX}$ and the thickness d of piezoelectric substrate ($P_{TX}$) is zero. The phase velocity at each mark ● is approximately equal to the $V_{fd=0}$ value. Thus, the fd value, in which the phase velocity of the elastic wave in the bilayer zone $B_{TX}$ or $B_{TY}$ is approximately equal to the $V_{fd=0}$ value, gives the maximum $k^2$ value.

Figure 20:
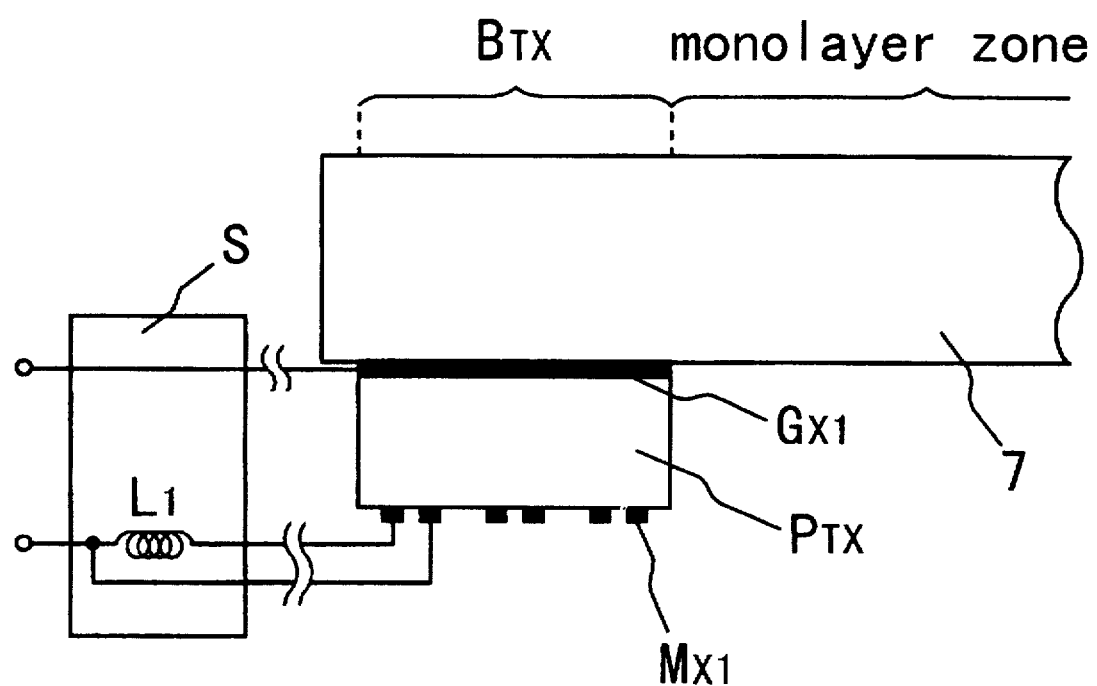
FIG. 20 shows a fragmentary sectional view of an elastic wave position-sensing device according to a sixth embodiment of the present invention.

FIG. 20 shows a fragmentary sectional view of an elastic wave position-sensing device according to a sixth embodiment of the present invention. The elastic wave position-sensing device in FIG. 20 has the same construction as the elastic wave position-sensing device in FIG. 9, except for using of non piezoelectric plate (7) in place of non piezoelectric plate (1). FIG. 20 shows only nonpiezoelectric plate (7), piezoelectric substrate ($P_{TX}$), interdigital transducer ($M_{X1}$), earth electrode ($G_{X1}$) and phase shifter (S). The elastic wave position-sensing device according to the sixth embodiment is operated in the same way as the elastic wave position-sensing device according to the second embodiment, and has the same function as the elastic wave position-sensing device according to the second embodiment.

Compared with the elastic wave position-sensing device according to the fifth embodiment, the elastic wave position-sensing device according to the sixth embodiment can be operated under still lower power consumption owing to the excitation of the unidirectional elastic wave. In addition, no reflection of an elastic wave generates at the side surface of the bilayer zones in the elastic wave position-sensing device according to the sixth embodiment, because of the excitation of the unidirectional elastic wave. Therefore, the elastic wave position-sensing device according to the sixth embodiment has little or no noise, so that has a still higher sensitivity.

Because the elastic wave travels the inside of the monolayer zone instead of the surface thereof, both the upper- and lower end surfaces of non piezoelectric plate (1) can be used for touching with a finger or others, and moreover, the elastic wave is not intercepted by touching with a finger or others under only a little pressure on the upper- and lower end surfaces of non piezoelectric plate (1). Accordingly, the elastic wave position-sensing device is not affected by only a light touch with a finger or others on the upper- and lower end surfaces of non piezoelectric plate (1). In addition, the elastic wave position-sensing device is not affected by food and drink such as coffee or mayonnaise dropped on the upper- and lower end surfaces of non piezoelectric plate (1).

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An elastic wave position-sensing device comprising:
   two elastic wave transducing units X and Y, each thereof consisting of
   a piezoelectric substrate $P_T$ having two end surfaces running perpendicular to the direction of the thickness d thereof,
   a piezoelectric substrate $P_R$ having two end surfaces running perpendicular to the direction of the thickness d thereof,
   an input interdigital transducer $T_O$ formed on one end surface of said piezoelectric substrate $P_T$,
   N input interdigital transducers $T_i$ (i=1, 2, . . . , N) formed on said one end surface of said piezoelectric substrate $P_T$,
   an output interdigital transducer $R_O$ opposed to said interdigital transducer $T_O$ and placed on one end surface of said piezoelectric substrate $P_R$ such that the finger direction of said interdigital transducer $R_O$ runs parallel with that of said interdigital transducer $T_O$, said thickness d of said piezoelectric substrates $P_T$ and $P_R$ being smaller than an interdigital periodicity P of said interdigital transducers $T_O$, $T_i$ and $R_O$, and
   at least two output interdigital transducers $R_{i1}$ and $R_{i2}$ (i=1, 2, . . . , N) opposed to each interdigital transducer $T_i$ and placed on said one end surface of said piezoelectric substrate $P_R$ such that the finger direction of said interdigital transducers $R_{i1}$ and $R_{i2}$ is slanting to that of said interdigital transducer $T_i$ by an angle α, respectively, an interdigital periodicity $P_N$ along the vertical direction to the finger direction of said interdigital transducers $R_{i1}$ and $R_{i2}$ being equal to the product of said interdigital periodicity P and cos α;
   a nonpiezoelectric plate having two end surfaces, the thickness of said nonpiezoelectric plate being smaller than two times said thickness d, said piezoelectric substrates $P_T$ and $P_R$ being mounted on one end surface of said nonpiezoelectric plate; and
   a controlling system connected with said elastic wave transducing units X and Y,
   a part, adjacent to said piezoelectric substrate $P_T$, of said nonpiezoelectric plate, and said piezoelectric substrate $P_T$ forming a bilayer zone $B_T$,
   a part, adjacent to said piezoelectric substrate $P_R$, of said nonpiezoelectric plate, and said piezoelectric substrate $P_R$ forming a bilayer zone $B_R$,
   the remaining part, between said bilayer zones $B_T$ and $B_R$, of said nonpiezoelectric plate consisting of a monolayer zone,
   each of said interdigital transducers $T_O$ and $T_i$ receiving an electric signal with a frequency approximately corresponding to said interdigital periodicity P, exciting an elastic wave of the $S_O$ mode and the higher order modes in said bilayer zone $B_T$, and transmitting said elastic wave, having the wavelength approximately equal to said interdigital periodicity P, to said bilayer zone $B_R$ through said monolayer zone, the phase velocity of said elastic wave being approximately equal to the phase velocity $V_{fd=0}$, of the $S_O$ mode elastic wave, corresponding to a condition that the product fd of the frequency f of said elastic wave and said thickness d is zero,
   said interdigital transducer $R_O$ transducing said elastic wave excited by said interdigital transducer $T_O$ to an electric signal with a phase $\theta_{base}$ and delivering said electric signal,
   each of said interdigital transducers $R_{i1}$ and $R_{i2}$ transducing said elastic wave excited by each interdigital transducer $T_i$ to electric signals $E_j$ (j=1, 2, . . . , χ) with phases $\theta_j$ (j=1, 2, . . . , χ), respectively, said phases $\theta_j$ corresponding to positions $F_j$ (j=1, 2, . . . , χ) on one or the other end surface of said monolayer zone, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$,
   said interdigital transducers $T_i$ and $R_{i1}$ forming N propagation lanes $D_{i1}$ (i=1, 2, . . . , N) of the elastic wave in said monolayer zone, each propagation lane $D_{i1}$ consisting of minute propagation lanes $Z_j$ (j=1, 2, . . . , χ) corresponding to said positions $F_j$,
   said interdigital transducers $T_i$ and $R_{i2}$ forming N propagation lanes $D_{i2}$ (i=1, 2, . . . , N) of the elastic wave in said monolayer zone, each propagation lane $D_{i2}$ consisting of minute propagation lanes $Z_j$ (j=1, 2, . . . , χ) corresponding to said positions $F_j$,
   one of said interdigital transducers $R_{i1}$ and $R_{i2}$ delivering an electric signal E with a phase θ only when touching a position $F_X$, out of said positions $F_j$, on a minute propagation lane $Z_X$ out of said minute propagation lanes $Z_j$, said position $F_X$ corresponding to an electric signal $E_X$ with a phase $\theta_X$, said total electric signal $\Sigma E_j$ minus said electric signal $E_X$ being equal to said electric signal E, said total phase $\Sigma\theta_j$ minus said phase $\theta_X$ being equal to said phase θ,
   said controlling system sensing a touch with a finger or others on said position $F_X$ by an appearance of said electric signal E at said one of said interdigital transducers $R_{i1}$ and $R_{i2}$, and finding said position $F_X$ by detecting said one, delivering said electric signal E, of said interdigital transducers $R_{i1}$ and $R_{i2}$, and by evaluating a difference between said phases θ and $\theta_{base}$.

2. An elastic wave position-sensing device as defined in claim 1, wherein the thickness of said nonpiezoelectric plate is smaller than said thickness d, and said nonpiezoelectric plate is made of a material such that the phase velocity of the elastic wave traveling on said nonpiezoelectric plate alone is higher than that traveling on said piezoelectric substrates $P_T$ and $P_R$ alone.

3. An elastic wave position-sensing device as defined in claim 1, wherein the thickness of said nonpiezoelectric plate is approximately equal to said thickness d, and said nonpiezoelectric plate is made of a material such that the phase velocity of the elastic wave traveling on said nonpiezoelectric plate alone is approximately equal to that traveling on said piezoelectric substrates $P_T$ and $P_R$ alone.

4. An elastic wave position-sensing device as defined in claim 1, wherein the thickness of said nonpiezoelectric plate is larger than said thickness d, and said nonpiezoelectric plate is made of a material such that the phase velocity of the elastic wave traveling on said nonpiezoelectric plate alone is lower than that traveling on said piezoelectric substrates $P_T$ and $P_R$ alone.

5. An elastic wave position-sensing device as defined in claim 1 further comprising:

N switches $W_i$ (i=1, 2, . . . , N) corresponding to said interdigital transducers $T_i$, an output terminal of each switch $W_i$ being connected with an input terminal of each interdigital transducer $T_i$, output terminals of said interdigital transducers $R_{i1}$ being connected with each other at an output point $Q_1$, output terminals of said interdigital transducers $R_{i2}$ being connected with each other at an output point $Q_2$, said controlling system turning on and off said switches $W_i$ with a fixed period in turn, sensing a touch on said position $F_X$ by an appearance of said electric signal E at one of said output points $Q_1$ and $Q_2$, and finding said position $F_X$ by detecting said one, delivering said electric signal E, of said output points $Q_1$ and $Q_2$, by choosing a closed one out of said switches $W_i$ when said electric signal E appears, and by evaluating said difference between said phases θ and $θ_{base}$.

6. An elastic wave position-sensing device as defined in claim 1, wherein the sum of an overlap length $L_P$ along the finger direction of said interdigital transducer $R_{i1}$ and that of said interdigital transducer $R_{i2}$ is approximately equal to the product of an overlap length L of said interdigital transducer $T_i$ and sec α.

7. An elastic wave position-sensing device as defined in claim 1, wherein two neighbors of said propagation lanes $D_{i1}$ and $D_{i2}$ are closed or partially overlapping each other.

8. An elastic wave position-sensing device as defined in claim 1, wherein said propagation lanes $D_{i1}$ and $D_{i2}$ of said elastic wave transducing unit X and that of said elastic wave transducing unit Y are vertical to each other.

9. An elastic wave position-sensing device as defined in claim 1 further comprising:

an amplifier $A_X$, an input terminal of said interdigital transducer $R_O$ of said elastic wave transducing unit X being connected with each input terminal of said interdigital transducer $T_O$ of said elastic wave transducing units X and Y via said amplifier $A_X$, said interdigital transducers $T_O$ and $R_O$ in said elastic wave transducing unit X, a propagation lane of an elastic wave between said interdigital transducers $T_O$ and $R_O$ in said elastic wave transducing unit X, and said amplifier $A_X$ forming an oscillator.

10. An elastic wave position-sensing device comprising:

two elastic wave transducing units X and Y, each thereof consisting of a piezoelectric substrate $P_T$ having two end surfaces running perpendicular to the direction of the thickness d thereof, a piezoelectric substrate $P_R$ having two end surfaces running perpendicular to the direction of the thickness d thereof, an input interdigital transducer $T_O$ formed on one end surface of said piezoelectric substrate $P_T$, N input interdigital transducers $M_i$ (i=1, 2, . . . , N) formed on said one end surface of said piezoelectric substrate $P_T$, each interdigital transducer MI consisting of two electrodes $M_{i-1}$, and $M_{i-2}$ and having two kinds of distances between one electrode finger of said electrode $M_{i-1}$ and two neighboring electrode fingers of said electrode $M_{i-2}$, an output interdigital transducer $R_O$ opposed to said interdigital transducer $T_O$ and placed on one end surface of said piezoelectric substrate $P_R$ such that the finger direction of said interdigital transducer $R_O$ runs parallel with that of said interdigital transducer $T_O$, said thickness d of said piezoelectric substrates $P_T$ and $P_R$ being smaller than an interdigital periodicity P of said interdigital transducers $T_O$, $T_i$ and $R_O$, and at least two output interdigital transducers $R_{i1}$ and $R_{i2}$ (i=1, 2, . . . , N) opposed to each interdigital transducer MI and placed on said one end surface of said piezoelectric substrate $P_R$ such that the finger direction of said interdigital transducers $R_{i1}$ and $R_{i2}$ is slanting to that of said interdigital transducer $M_i$ by an angle α, respectively, an interdigital periodicity $P_N$ along the vertical direction to the finger direction of said interdigital transducers $R_{i1}$ and $R_{i2}$ being equal to the product of said interdigital periodicity P and cos α, N earth electrodes $G_i$ (i=1, 2, . . . , N) formed on the other end surface of said piezoelectric substrate $P_T$ and corresponding with said interdigital transducers $M_i$, respectively, and a phase shifter S including at least a coil $L_1$;

a nonpiezoelectric plate having two end surfaces, the thickness of said nonpiezoelectric plate being smaller than two times said thickness d, said piezoelectric substrates $P_T$ and $P_R$ being mounted on one end surface of said nonpiezoelectric plate; and a controlling system connected with said elastic wave transducing units X and Y, a part, adjacent to said piezoelectric substrate $P_T$, of said nonpiezoelectric plate, and said piezoelectric substrate $P_T$ forming a bilayer zone $B_T$, a part, adjacent to said piezoelectric substrate $P_R$, of said nonpiezoelectric plate, and said piezoelectric substrate $P_R$ forming a bilayer zone $B_R$, the remaining part, between said bilayer zones $B_T$ and $B_R$, of said nonpiezoelectric plate consisting of a monolayer zone, said interdigital transducer $T_O$ receiving an electric signal with a frequency approximately corresponding to said interdigital periodicity P, exciting an elastic wave of the $S_O$ mode and the higher order modes in said bilayer zone $B_T$, and transmitting said elastic wave, having the wavelength approximately equal to said interdigital periodicity P, to said bilayer zone $B_R$ through said monolayer zone, the phase velocity of said elastic wave being approximately equal to the phase velocity $V_{fd=0}$, of the $S_O$ mode elastic wave, corresponding to a condition that the product fd of the frequency f of said elastic wave and said thickness d is zero, said interdigital transducer $R_O$ transducing said elastic wave excited by said interdigital transducer $T_O$ to an electric signal with a phase $θ_{base}$ and delivering said electric signal, each interdigital transducer $M_i$ and each earth electrode $G_i$ receiving an electric signal $V_1$ with a frequency approximately corresponding to said interdigital periodicity P between said electrode $M_{i-1}$ and said earth electrode $G_1$, and another electric signal $V_2$ with a frequency equal to that of said electric signal $V_1$ between said electrode $M_{i-2}$ and said earth electrode $G_i$ via said phase shifter S, exciting an unidirectional elastic wave of the $S_0$ mode and the higher order modes in said bilayer zone $B_T$, and transmitting said unidirectional elastic wave, having the wavelength approximately equal to said interdigital periodicity P, to said bilayer zone $B_R$ through said monolayer zone, the phase difference between said electric signals $V_1$ and $V_2$ being $2\pi y$, the phase velocity of said elastic wave being approximately equal to the phase velocity $V_{fd=0}$, of the $S_0$ mode elastic wave, corresponding to a condition that the product fd of the frequency f of said elastic wave and said thickness d is zero, each of said interdigital transducers $R_{i1}$ and $R_{i2}$ transducing said elastic wave excited by each interdigital transducer $M_i$ and each earth electrode $G_i$ to electric signals $E_j$ (j=1, 2, ..., χ) with phases $\theta_j$ (j=1, 2, ..., χ), respectively, said phases $\theta_j$ corresponding to positions $F_j$ (j=1, 2, ..., χ) on one or the other end surface of said monolayer zone, each electric signal $E_j$ having a frequency approximately corresponding to said interdigital periodicity P, the total phase $\Sigma\theta_j$ made by said phases $\theta_j$ being zero, the total electric signal $\Sigma E_j$ made by said electric signals $E_j$ being zero and not able to be detected at each of said interdigital transducers $R_{i1}$ and $R_{i2}$, said interdigital transducers $M_i$ and $R_{i1}$ forming N propagation lanes $D_{i1}$ (i=1, 2, ..., N) of the elastic wave in said monolayer zone, each propagation lane $D_{i1}$ consisting of minute propagation lanes $Z_j$ (j=1, 2, ..., χ) corresponding to said positions $F_j$, said interdigital transducers $M_{i1}$ and $R_{i2}$ forming N propagation lanes $D_{i2}$ (i=1, 2, ..., N) of the elastic wave in said monolayer zone, each propagation lane $D_{i2}$ consisting of minute propagation lanes $Z_j$ (j=1, 2, ..., χ) corresponding to said positions $F_j$, one of said interdigital transducers $R_{i1}$ and $R_{i2}$ delivering an electric signal E with a phase $\theta$ only when touching a position $F_X$, out of said positions $F_j$, on a minute propagation lane $Z_X$ out of said minute propagation lanes $Z_j$, said position $F_X$ corresponding to an electric signal $E_X$ with a phase $\theta_X$, said total electric signal $\Sigma E_j$ minus said electric signal $E_X$ being equal to said electric signal E, said total phase $\Sigma\theta_j$ minus said phase $\theta_X$ being equal to said phase $\theta$, said controlling system sensing a touch with a finger or others on said position $F_X$ by an appearance of said electric signal E at said one of said interdigital transducers $R_{i1}$ and $R_{i2}$, and finding said position $F_X$ by detecting said one, delivering said electric signal E, of said interdigital transducers $R_{i1}$ and $R_{i2}$, and by evaluating a difference between said phases $\theta$ and $\theta_{base}$.

11. An elastic wave position-sensing device as defined in claim 10, wherein the thickness of said nonpiezoelectric plate is smaller than said thickness d, and said nonpiezoelectric plate is made of a material such that the phase velocity of the elastic wave traveling on said nonpiezoelectric plate alone is higher than that traveling on said piezoelectric substrates $P_T$ and $P_R$ alone.

12. An elastic wave position-sensing device as defined in claim 10, wherein the thickness of said nonpiezoelectric plate is approximately equal to said thickness d, and said nonpiezoelectric plate is made of a material such that the phase velocity of the elastic wave traveling on said nonpiezoelectric plate alone is approximately equal to that traveling on said piezoelectric substrates $P_T$ and $P_R$ alone.

13. An elastic wave position-sensing device as defined in claim 10, wherein the thickness of said nonpiezoelectric plate is larger than said thickness d, and said nonpiezoelectric plate is made of a material such that the phase velocity of the elastic wave traveling on said nonpiezoelectric plate alone is lower than that traveling on said piezoelectric substrates $P_T$ and $P_R$ alone.

14. An elastic wave position-sensing device as defined in claim 10 further comprising:

N pairs of switches $W_i$ (i=1, 2, ..., N) corresponding to said interdigital transducers $M_i$, each pair of switches $W_i$ consisting of two switches $W_{i1}$ and $W_{i2}$, and output terminals of said switches $W_{i1}$ and $W_{i2}$ being connected with input terminals of said electrodes $M_{i-1}$ and $M_{i-2}$, respectively, output terminals of said interdigital transducers $R_{i1}$ being connected with each other at an output point $Q_1$, output terminals of said interdigital transducers $R_{i2}$ being connected with each other at an output point $Q_2$, said controlling system turning on and off said switches $W_i$ with a fixed period in turn, sensing a touch on said position $F_X$ by an appearance of said electric signal E at one of said output points $Q_1$ and $Q_2$, and finding said position $F_X$ by detecting said one, delivering said electric signal E, of said output points $Q_1$ and $Q_2$, by choosing a closed one out of said switches $W_i$ when said electric signal E appears, and by evaluating said difference between said phases $\theta$ and $\theta_{base}$.

15. An elastic wave position-sensing device as defined in claim 10, wherein x<½ in a shorter distance xP of said two kinds of distances between one electrode finger of said electrode $M_{i-1}$ and two neighboring electrode fingers of said electrode $M_{i-2}$, and x+y=±½ in said phase difference $2\pi y$ between said electric signals $V_1$ and $V_2$.

16. An elastic wave position-sensing device as defined in claim 10, wherein the sum of an overlap length $L_P$ along the finger direction of said interdigital transducer $R_{i1}$ and that of said interdigital transducer $R_{i2}$ is approximately equal to the product of an overlap length L of said interdigital transducer $M_i$ and sec α.

17. An elastic wave position-sensing device as defined in claim 10, wherein two neighbors of said propagation lanes $D_{i1}$ and $D_{i2}$ are closed or partially overlapping each other.

18. An elastic wave position-sensing device as defined in claim 10, wherein said propagation lanes $D_{i1}$ and $D_{i2}$ of said elastic wave transducing unit X and that of said elastic wave transducing unit Y are vertical to each other.

19. An elastic wave position-sensing device as defined in claim 10 further comprising:

an amplifier $A_X$, an input terminal of said interdigital transducer $R_O$ of said elastic wave transducing unit X being connected with each input terminal of said interdigital transducer $T_O$ of said elastic wave transducing units X and Y via said amplifier $A_X$, said interdigital transducers $T_O$ and $R_O$ in said elastic wave transducing unit X, a propagation lane of an elastic wave between said interdigital transducers $T_O$ and $R_O$ in said elastic wave transducing unit X, and said amplifier $A_X$ forming an oscillator.

20. An elastic wave position-sensing device as defined in claim 10, wherein each of said piezoelectric substrates $P_T$ and $P_R$ is made of a piezoelectric polymer such as PVDF and so on, or is made of a piezoelectric ceramic, the polarization axis thereof being parallel to the thickness direction thereof.

* * * * *